(12) United States Patent
Biswas et al.

(10) Patent No.: US 9,392,144 B2
(45) Date of Patent: Jul. 12, 2016

(54) VIDEO SYNCHRONIZATION BASED ON AN AUDIO CUE

(71) Applicant: Adobe Systems Incorporated, San Jose, CA (US)

(72) Inventors: Sanjeev Kumar Biswas, Bangalore (IN); Arijit Chatterjee, Bangalore (IN); Gaurav Luthra, Haryana (IN); Kausar Munshi, West Bengal (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/312,173

(22) Filed: Jun. 23, 2014

(65) Prior Publication Data

US 2015/0373231 A1    Dec. 24, 2015

(51) Int. Cl.
*H04N 5/50* (2006.01)
*H04N 5/04* (2006.01)

(52) U.S. Cl.
CPC ........................................ *H04N 5/04* (2013.01)

(58) Field of Classification Search
USPC ................................................ 725/151, 105
See application file for complete search history.

(56) References Cited

U.S. PATENT DOCUMENTS

| | | | |
|---|---|---|---|
| 7,503,488 B2 | 3/2009 | Davis | |
| 2005/0190928 A1* | 9/2005 | Noto | ........................ H04R 3/12 381/77 |
| 2011/0076942 A1 | 3/2011 | Taveau et al. | |
| 2011/0191823 A1 | 8/2011 | Huibers | |
| 2012/0194737 A1* | 8/2012 | Cafarella | ................ G10L 25/48 348/512 |
| 2013/0272672 A1* | 10/2013 | Padro Rondon | ....... G03B 31/04 386/201 |
| 2014/0028914 A1 | 1/2014 | Polak et al. | |
| 2014/0106710 A1* | 4/2014 | Rodriguez | .......... H04M 1/7253 455/411 |

OTHER PUBLICATIONS

Wang, A.L., "An industrial-strength audio search algorithm", ISMIR 2003, 4th Symposium Conference on Music Information Retrieval, pp. 7-13 (2003).

* cited by examiner

*Primary Examiner* — Jefferey Harold
*Assistant Examiner* — Sihar Karwan
(74) *Attorney, Agent, or Firm* — Finch & Maloney PLLC

(57) ABSTRACT

Techniques are disclosed for manipulating a media player based on the environment in which content is consumed. For example, a user listening to a radio broadcast or some other ambient sound hears a song begin to play. Recognizing the song, the user wishes to watch an associated music video. A smartphone is used to record a portion of the ambient sound using an application configured according to certain disclosed embodiments. The observed audio is compared with one or more archived audio segments, each of which is associated with corresponding video content. If a match is found between the observed audio segment and an archived audio segment, video content corresponding to the matched archived audio segment is played back via a media player installed on the device. The playback is synchronized with the ambient sound. This allows the user to enjoy both the ambient audio and corresponding video content.

20 Claims, 17 Drawing Sheets

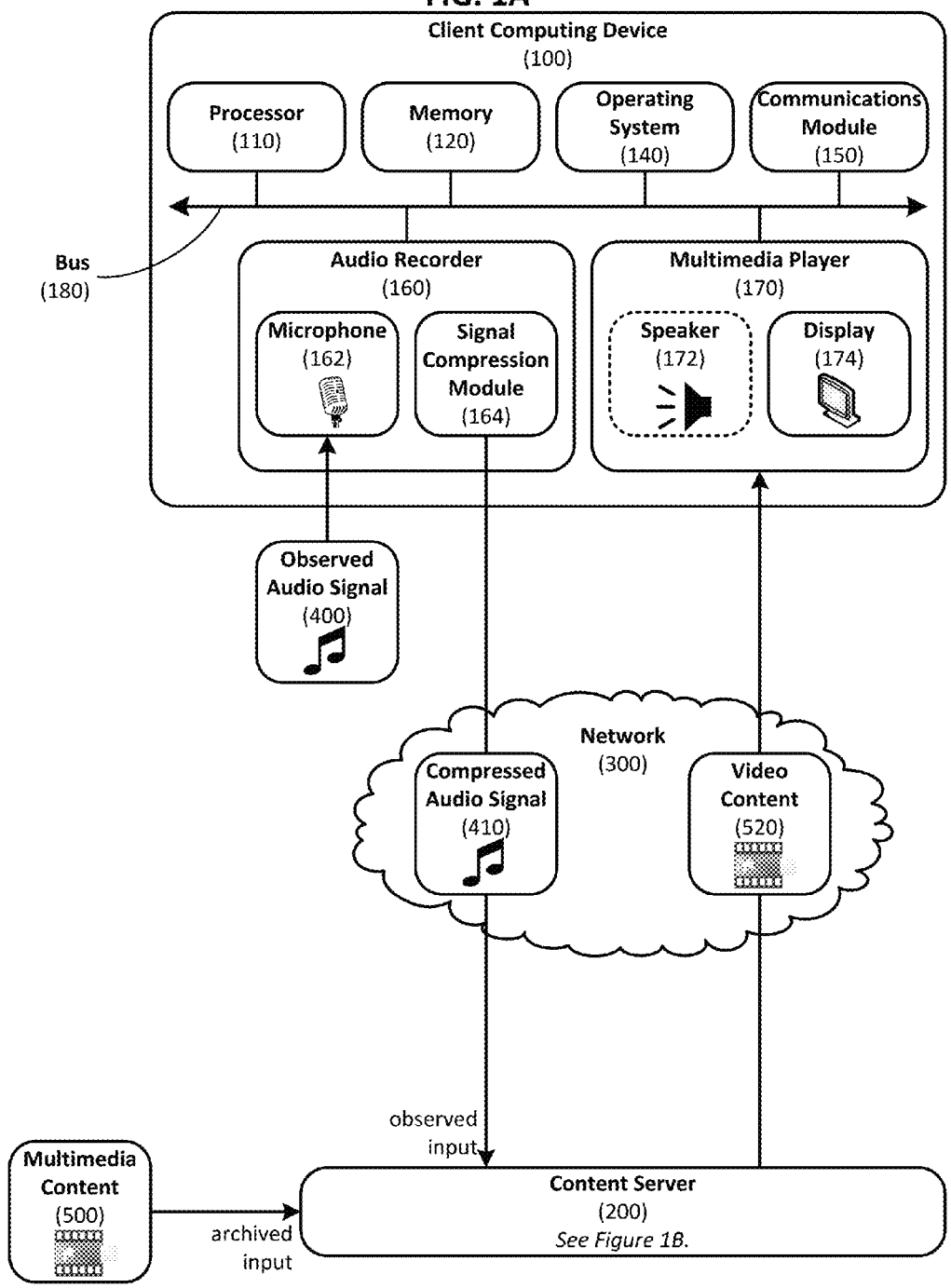

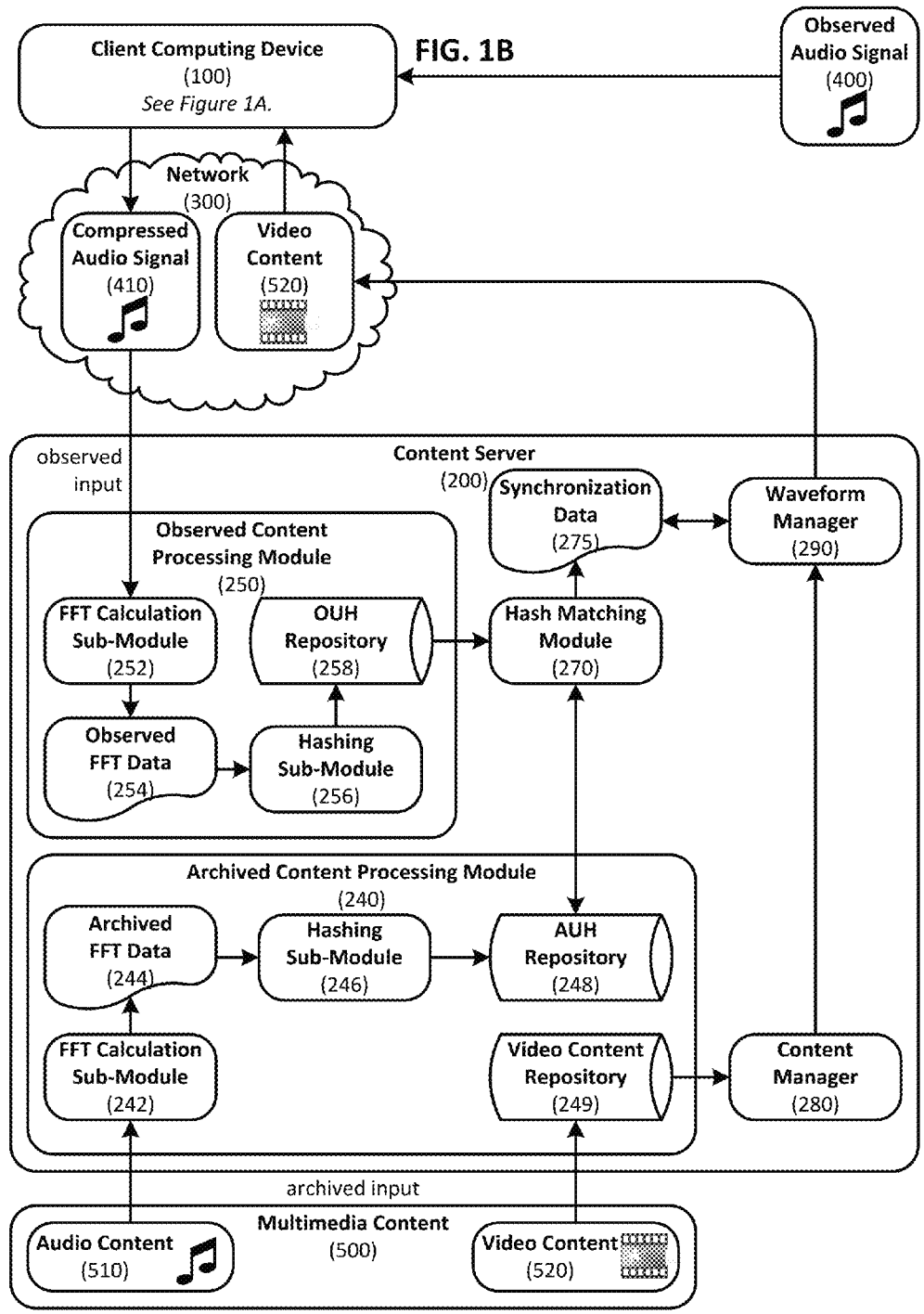

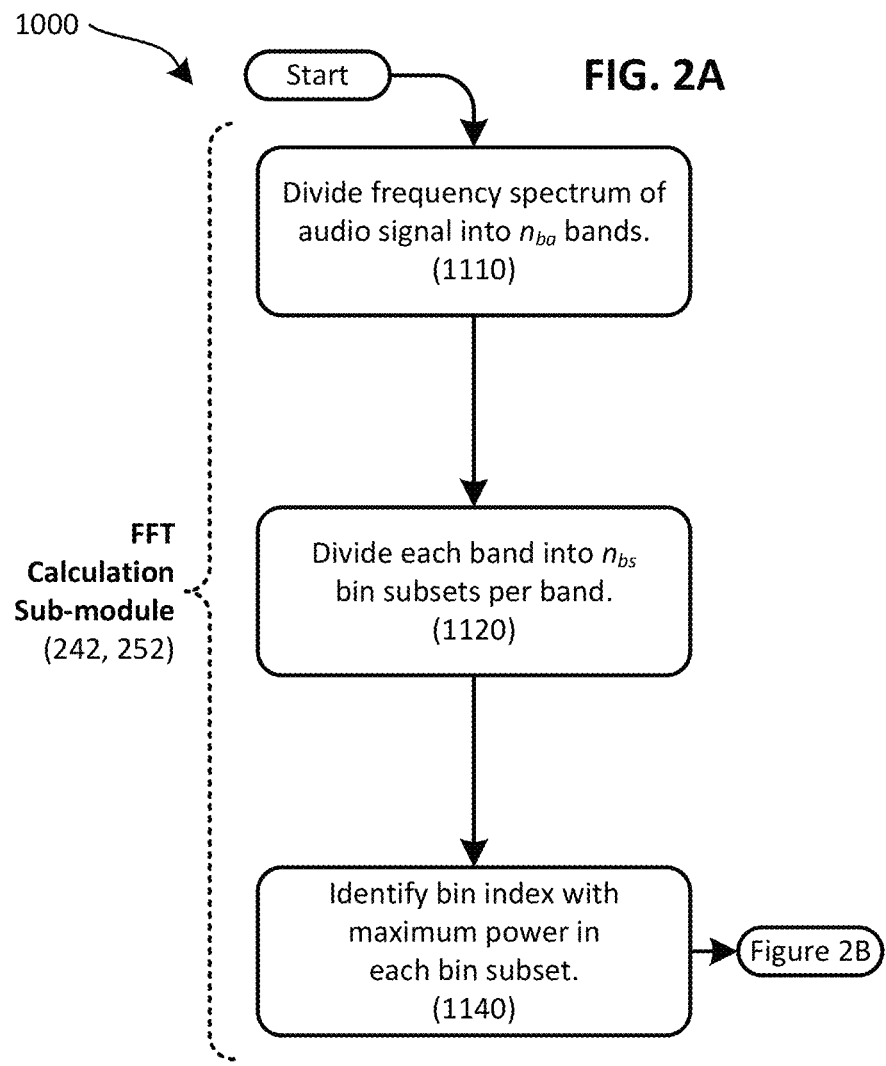

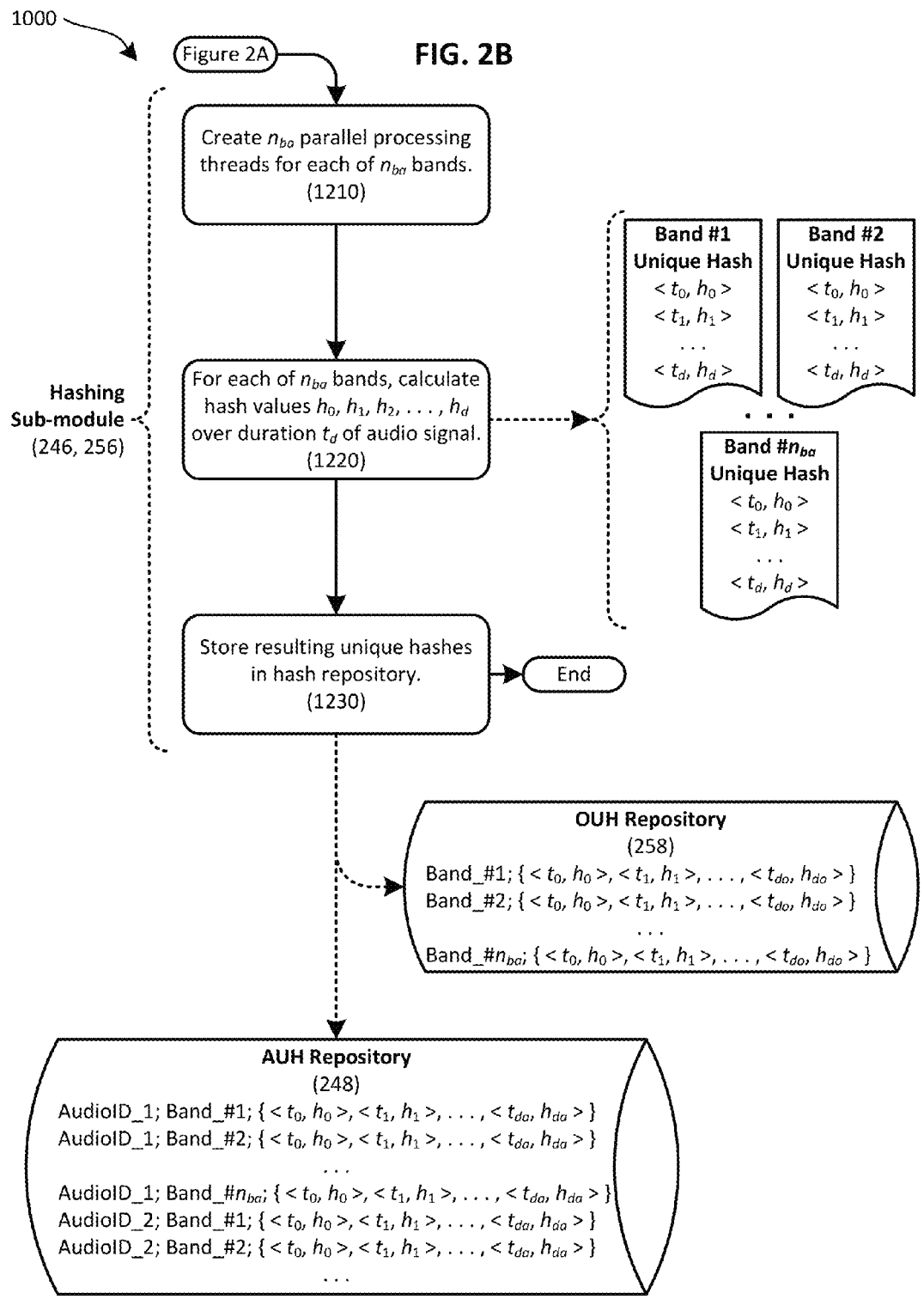

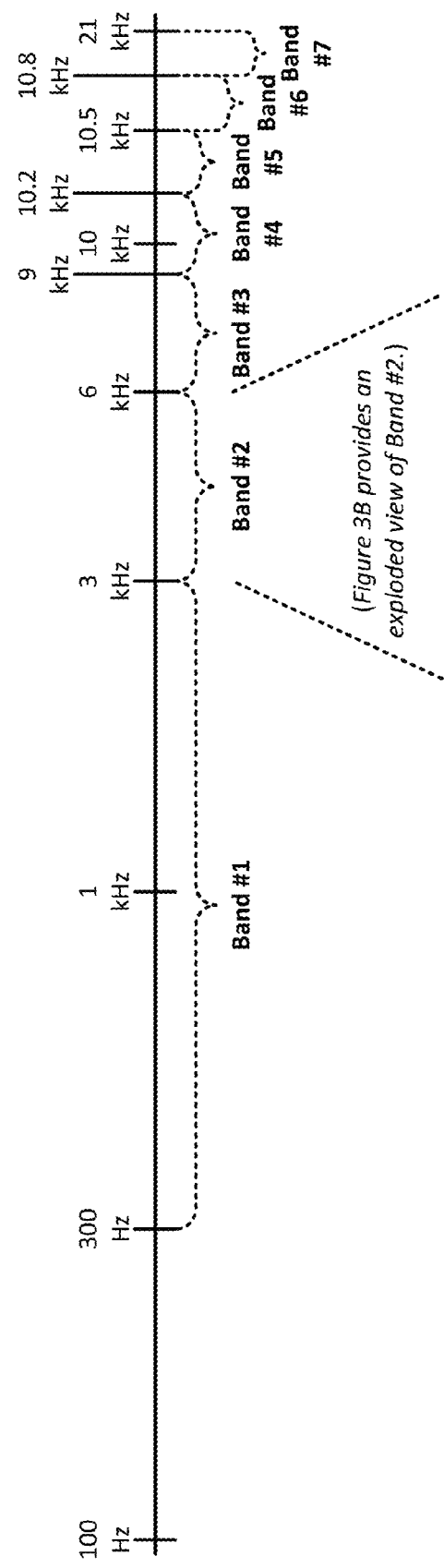

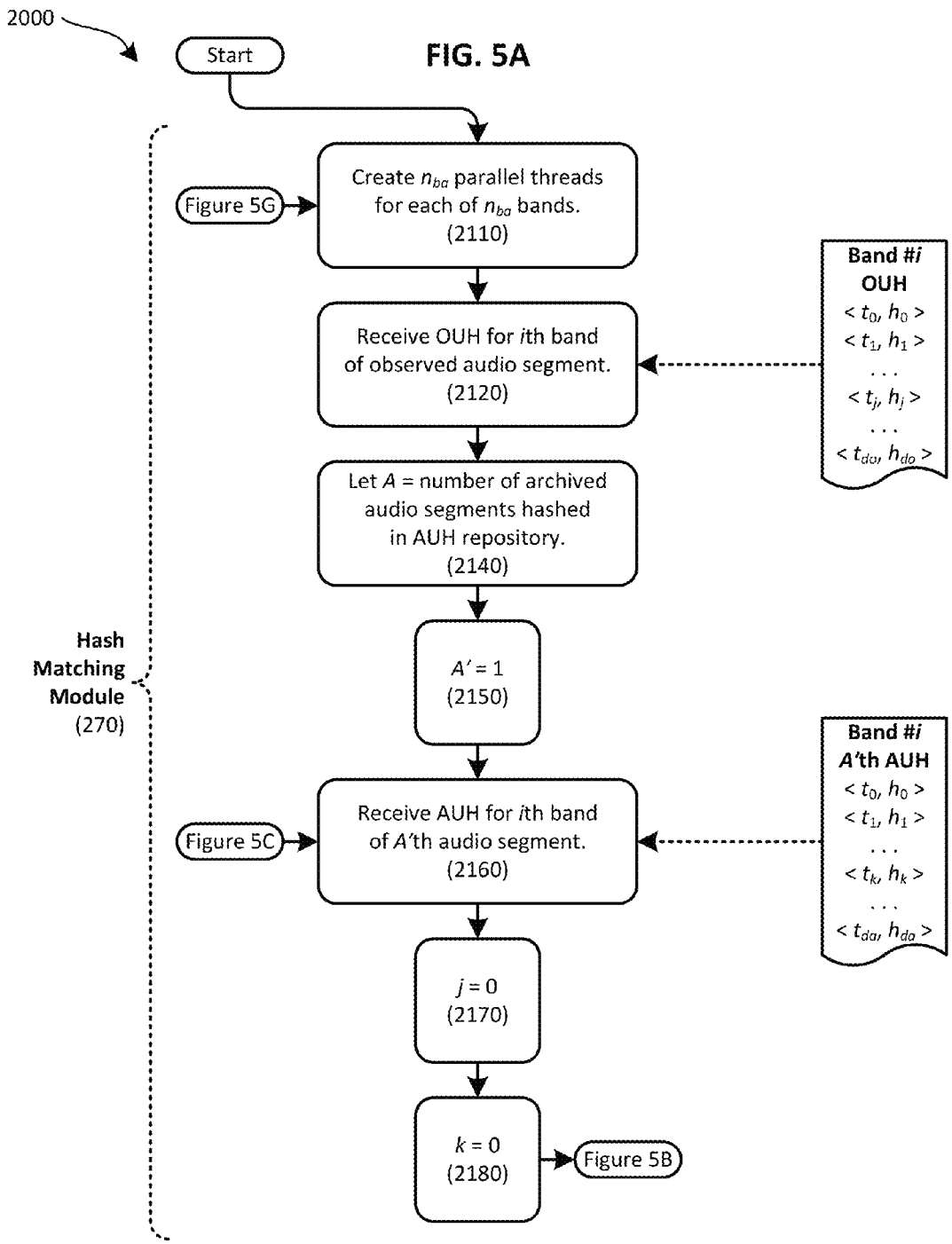

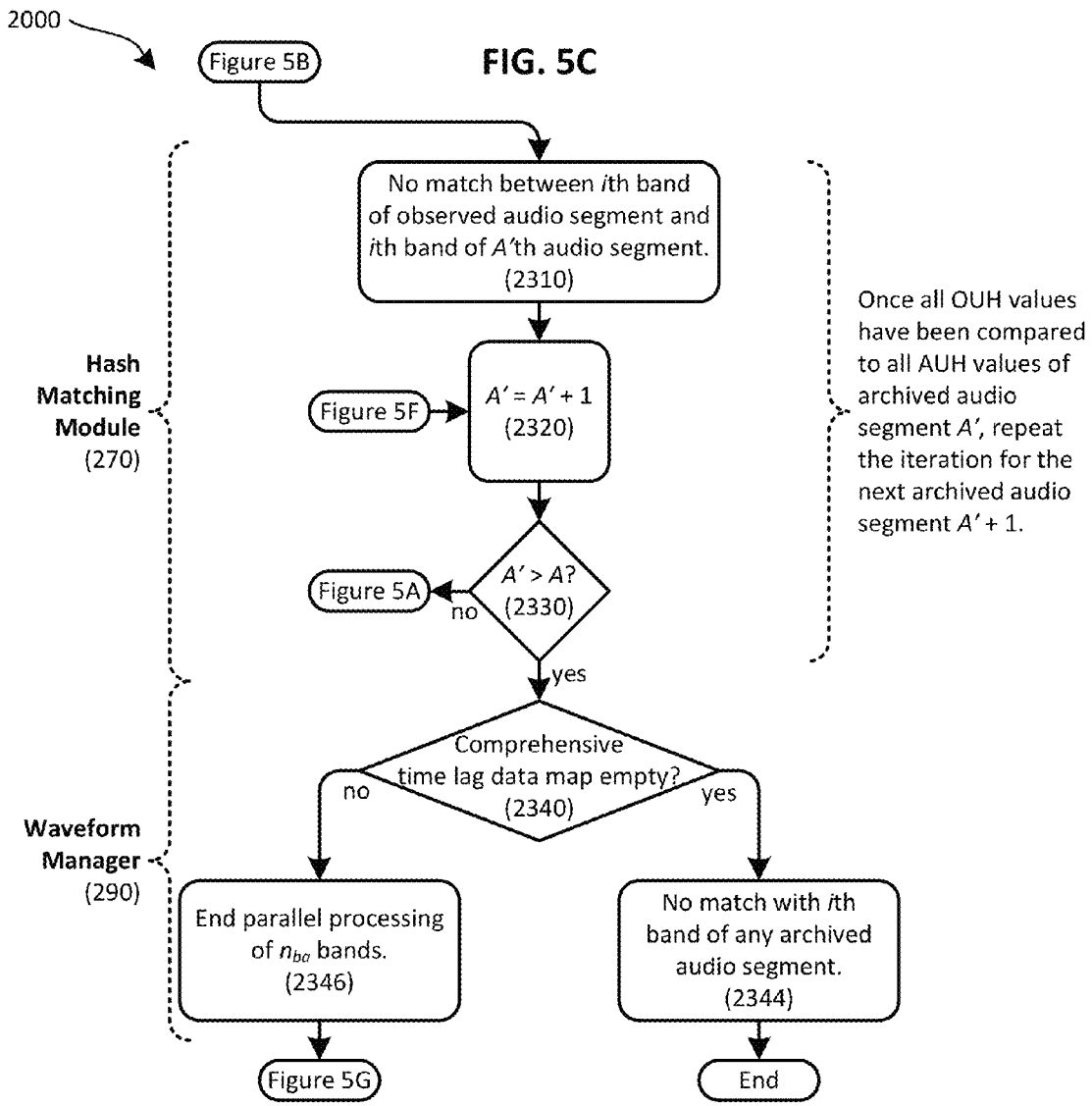

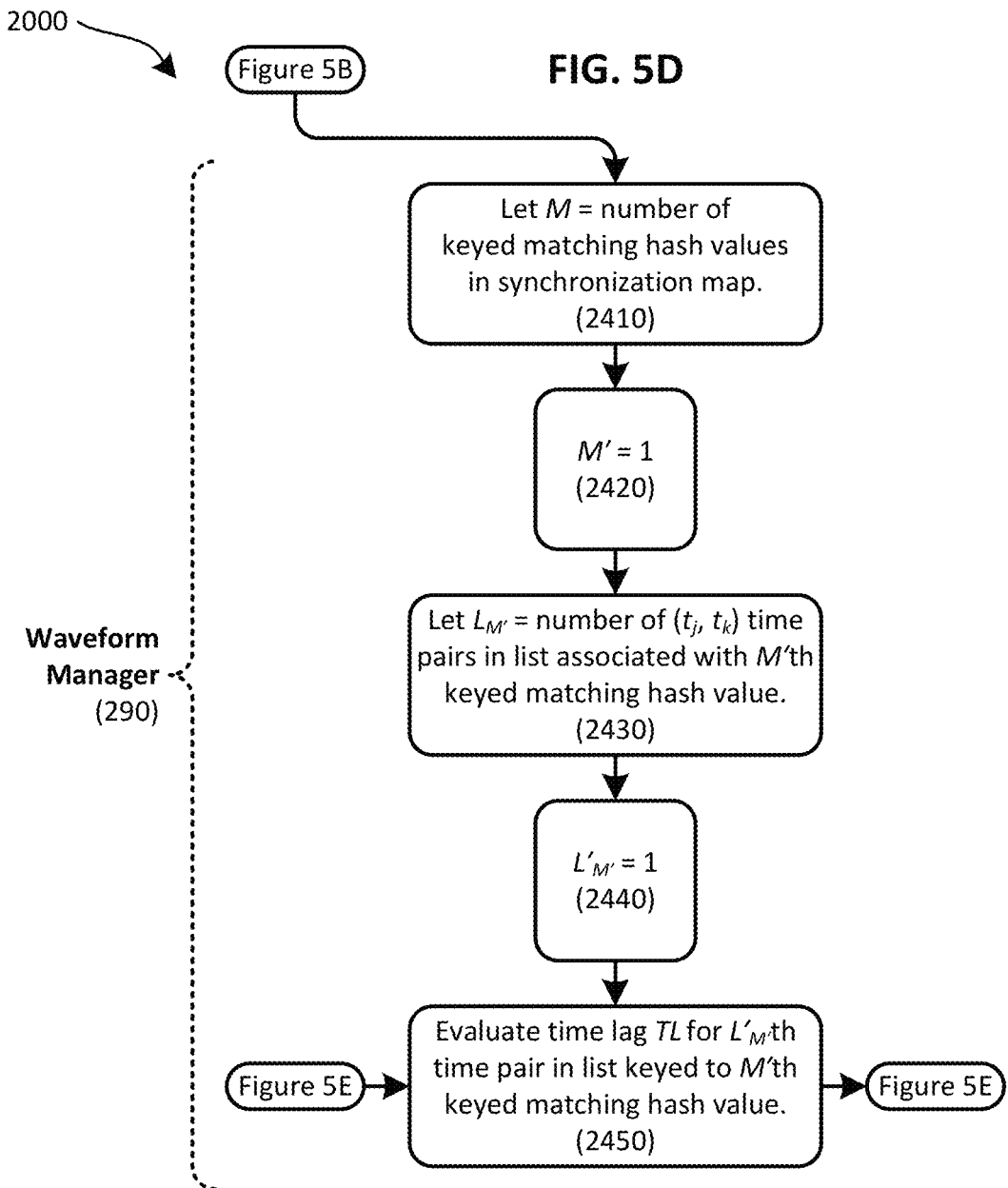

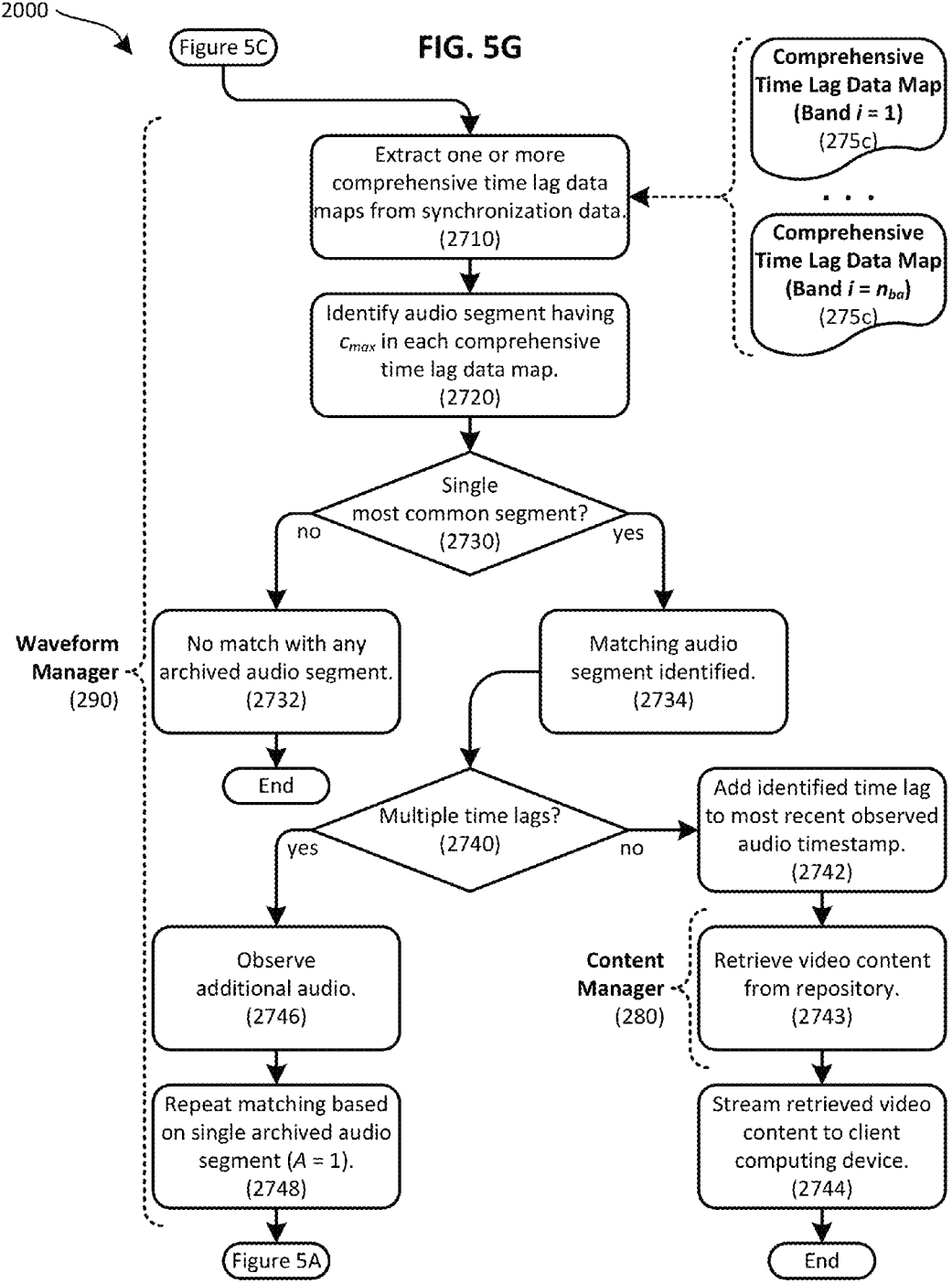

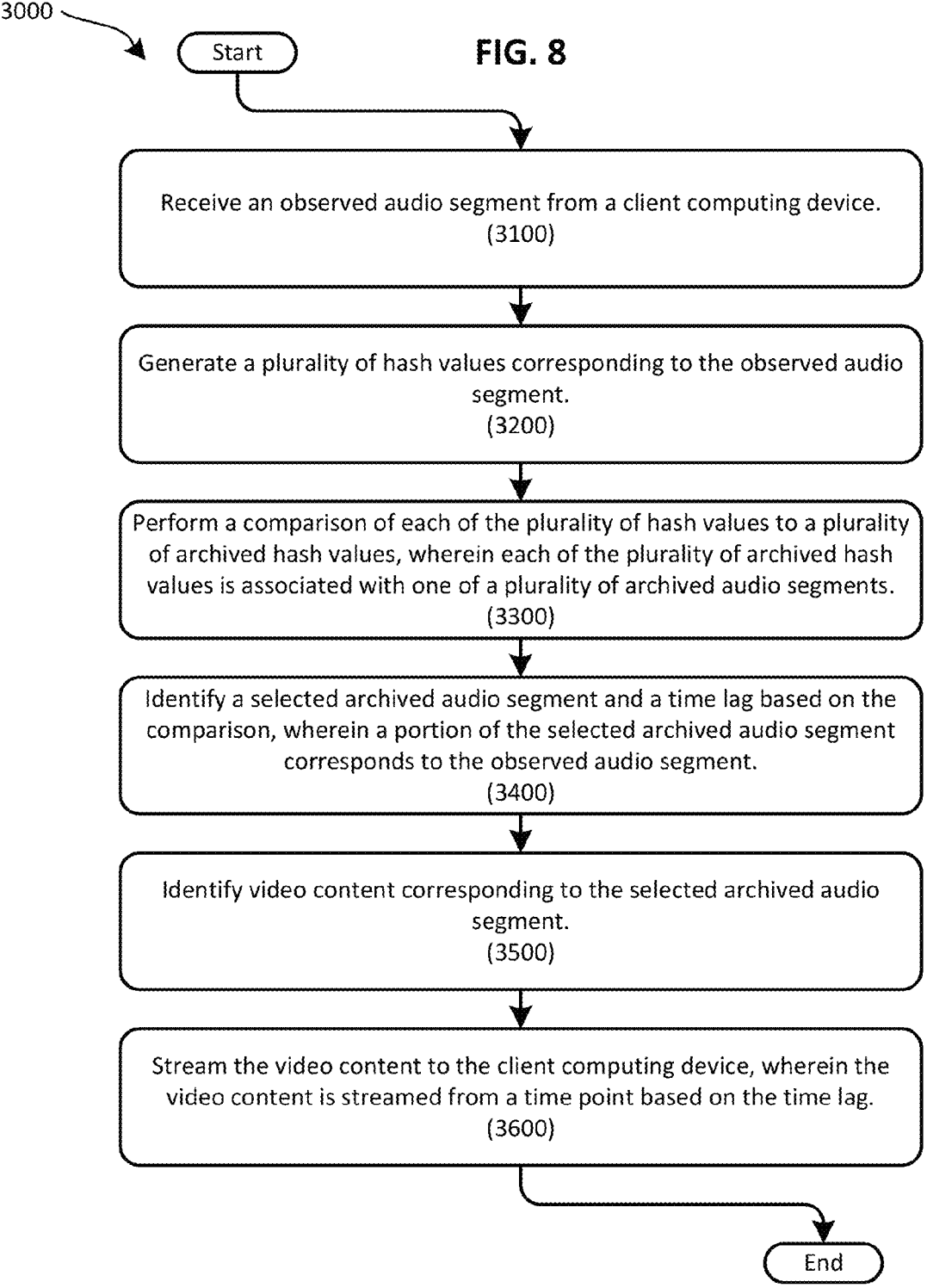

VIDEO SYNCHRONIZATION BASED ON AN AUDIO CUE

FIELD OF THE DISCLOSURE

This disclosure relates generally to signal processing techniques, and more specifically, to methods for synchronizing an observed audio signal with archived video content having an audio track that matches the observed audio signal.

BACKGROUND

As portable computing devices such as smartphones and tablet computers have become increasingly ubiquitous, consumers have come to expect such devices to provide a wide range of functionality. This functionality is provided by both hardware and software components. For example, in terms of hardware, these devices often include components such as a touch sensitive display, one or more speakers, a microphone, a gyroscope, one or more antennae for wireless communication, a compass, and an accelerometer. In terms of software, these devices are capable of executing an ever-growing number of applications which are specifically configured to take advantage of the aforementioned hardware. Among the more popular software applications used with portable computing devices are media players which are capable of playing music, video, animation, and other such multimedia content. In particular, a wide range of commercially and freely available media players can be used to play both locally saved and remotely streamed multimedia content on a portable device. In the case of remotely streamed content, such content can be prerecorded and archived at a server that is configured to stream the content in response to a client request. Content can also be streamed "live", such that a client can view the content nearly instantaneously with its initial recording. Regardless of how the content is streamed to the client, media players not only allow consumers to enjoy a wide range of multimedia content on their portable devices, but they also provide an valuable way for advertisers to reach a target audience.

BRIEF DESCRIPTION OF THE DRAWINGS

FIGS. 1A and 1B comprise a block diagram schematically illustrating selected components of a computer system that can be used to implement certain of the embodiments disclosed herein. In particular, FIG. 1A illustrates selected components of a client computing device, while FIG. 1B illustrates selected components of a content server.

FIGS. 2A and 2B comprise a flowchart illustrating an example method for generating unique hash data based on an observed or archived audio signal in accordance with certain of the embodiments disclosed herein.

FIG. 3A conceptually illustrates the division of an audible frequency spectrum into a plurality of frequency bands which can form the basis of the hashing technique illustrated in FIGS. 2A and 2B.

FIGS. 5A through 5G comprise a flowchart illustrating an example method for synchronizing an observed audio signal with archived video content associated with audio content that matches the observed audio signal in accordance with certain of the embodiments disclosed herein.

FIG. 8 is a flowchart illustrating an example method for synchronizing an observed audio signal with archived video content having an audio track that matches the observed audio signal.

DETAILED DESCRIPTION

Figure 3B:
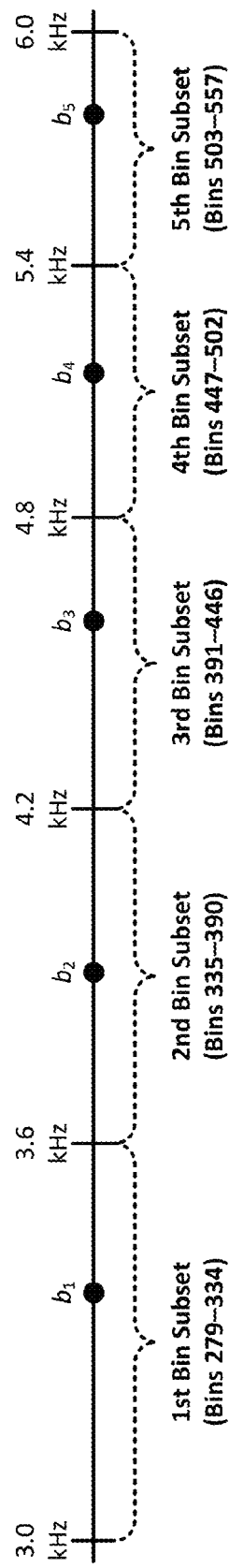
FIG. 3B conceptually illustrates the division of a frequency band of FIG. 3A into a plurality of frequency bin subsets which can form the basis of the hashing technique illustrated in FIGS. 2A and 2B.

Existing media players allow a user to consume a wide range of multimedia content, including both locally saved and remotely streamed content. Such players also provide a user with substantial control over how such content is consumed. For instance, a user can manipulate when playback of a media stream starts and stops, which can be particularly useful where a user does not wish to consume an entire media stream. To provide a specific example, in the case of a media stream that comprises a recorded baseball game, the user may wish to watch only the last three innings of the game. Existing media players also allow users to create customized playlists or to randomize playback of a collection of content items, both of which can be particularly useful in the context of audio content playback. In other applications, a media player can be configured to play primary and secondary content items which are acquired from different sources, such as where playback of a television program that is streamed from a first source is occasionally interrupted by playback of an advertisement that is streamed form a second source. While these features are useful in certain applications, the fact that existing media players function without regard to their operational environment is problematic. In particular, the inability to adapt media playback to a particular use context represents a substantial limitation on the functionality provided by existing media players.

Thus, and in accordance with certain of the embodiments disclosed herein, techniques are disclosed for manipulating the operation of a media player based on the environment in which content is consumed. For example, a user listening to a radio broadcast, a music performance, or some other source of ambient sound hears a popular song begin to play. Recognizing the song, the user wishes to watch an associated music video. A device such as a smartphone is used to record a portion of the observed ambient sound using an application configured according to certain of the embodiments disclosed herein. The observed audio segment is analyzed and compared with one or more archived audio segments, wherein each of the archived audio segments is associated with corresponding video content. If a match is found between the observed audio segment and an archived audio segment, video content corresponding to the matched archived audio segment is played back via a media player installed on the device. The playback is synchronized with the ongoing radio broadcast, music performance, or other ambient sound. This allows the user to enjoy both the ambient audio and corresponding video content.

Such embodiments provide media playback that is responsive to the environment in which the media is to be consumed. In particular, this allows users to consume video content that corresponds to observed audio, wherein the video content is also synchronized with the observed audio. As a result, a user can enjoy audiovisual content where only audio content, such as received via a radio broadcast, might otherwise be available. Not only does this enhance user experience, but it also provides a valuable way for advertisers to convert an audio impression, such as a radio advertisement, into an audiovisual impression. For instance, certain embodiments can be configured to detect an audio advertisement and play a synchronized visual segment in response to such detection. In addition to enhancing the advertiser's impression, this also provides the advertiser with a better understanding of parameters such as audience size and geolocation. In another example application, a content creator such as a radio show producer can invite listeners to synchronize their computing devices by simply recording a portion of the radio show. Once synchronized, dynamic content can be streamed to the participating listeners' devices, which can also be used to display video content associated with advertisements played during the course of the radio show. In this example application, the producer of the radio show can derive advertiser revenue based on the number of listeners subscribing to a synchronized video stream.

Certain embodiments can be understood as operating in a client-server computing environment, and include both client-side and server-side functionality. For example, a client-side device can be configured to execute an application that is capable of recording an observed audio segment, uploading the observed audio segment to a server, receiving synchronized video content from the server, and playing the received content. Several of the disclosed embodiments are specifically configured for, and described in the context of, use with a portable computing device capable of observing ambient audio via a microphone and playing back video content via a display screen. However, it will be appreciated that other embodiments can be implemented using a wide range of other computing devices, including desktop computers and smart television sets. Thus the present disclosure is not intended to be limited to implementation using any specific type of client computing device.

On the other hand, a server-side device can include a multimedia content archive that is configured in a way that facilitates subsequent matching of an observed audio segment with an archived audio segment. For example, in one embodiment such an archive is based on unique hash data that represents the various bands that comprise an audible frequency spectrum, thereby increasing the likelihood that a portion of the spectrum having peak power will be hashed at some point. Audio segments can be compared and matched based on this unique hash data. Once an archived audio segment is identified as a positive match with an observed audio segment, server-side techniques for determining a time gap between the observed and archived audio segments are provided. This enables video content corresponding to the matching archived audio segment to be streamed to the client device such that the video content is synchronized with the ambient audio.

As used herein, the term "data structure" refers, in addition to its ordinary meaning, to a way of storing and organizing data in a computer accessible memory so that data can be used by an application or software module. A data structure in its simplest form can be, for example, a set of one or more memory locations. In some cases, a data structure may be implemented as a so-called record, sometimes referred to as a struct or tuple, and may have any appropriate number of fields, elements or storage locations. As will be further appreciated, a data structure may include data of interest or a pointer that refers to a memory location where the data of interest can be found. A data structure may have any appropriate format such as, for example, a look-up table or index format; an array format; a hash table format; a graph, tree or hierarchal format having a number of nodes; an object format that includes data fields, for instance similar to a record; or a combination of the foregoing. A data structure may also include executable code for accessing and modifying the underlying structure and format. In a more general sense, the data structure may be implemented as a data set that can store specific values without being constrained to any particular order or format. In one embodiment, a data structure comprises a synchronization map, wherein matching audio hash values are keyed to time pairs associated with observed and archived audio segments. In another embodiment a data structure comprises a time lag data map for a particular archived audio segment, wherein a particular time lag is keyed to (a) a listing of time pairs associated with observed and archived audio segments, as well as (b) a count of such time pairs. In yet another embodiment a data structure comprises a comprehensive time lag data map for a plurality of archived audio segments, wherein an archived audio segment is keyed to a listing of (time lag, count) data pairs that are sorted by count in decreasing order. Numerous other data structure formats and applications will be apparent in light of this disclosure.

As used herein, the term "multimedia content" refers, in addition to its ordinary meaning, to audio, visual, or audio-visual information intended for consumption by a user, organization, or other human- or computer-controlled entity. Examples of multimedia content include an audible recording played via speakers or headphones, a visual presentation that includes one or more visual assets which may or may not change with the progression of time, and a combination of both audible and visual assets. Multimedia content can therefore be understood as including both audio content and video content in certain applications, and in such case the audio and video components can be separated and subjected to different processing techniques. Multimedia content can be stored in a compressed digital format and may be created and manipulated using any suitable editing application. For example, multimedia content can be stored in any suitable file format defined by the Moving Picture Experts Group (MPEG), including MPEG-4, can be stored as a sequence of frames defined in a color space such as red-green-blue (RGB) or luma-chrominance (YUV), or can be stored in any other suitable compressed or uncompressed file format, including file formats generated in real-time by animation engines, compositing engines, or other video generation applications. Multimedia content may also include information that is not specifically intended for display, and thus also encompasses items such as embedded executable instructions, scripts, hyperlinks, metadata, encoding information, and formatting information.

System Architecture

FIGS. 1A and 1B comprise a block diagram schematically illustrating selected components of a networked computer system that can be used to implement certain of the embodiments disclosed herein. Such embodiments can be understood as operating in a client-server computing environment and providing functionality that comprises a series of interactions between a client device that is operated by an end user and a content server that provides additional functionality and data to the client device. To this end, FIG. 1A illustrates selected components of an example client computing device 100, while FIG. 1B illustrates selected components of an example content server 200. The various modules and subcomponents comprising client computing device 100 and content server 200 will be described in turn.

In general, content server 200 can be understood as receiving one or more items of multimedia content 500 as "archived input". Multimedia content 500 preferably includes audiovisual content which corresponds to audio segments which may be observed by client computing device 100. Thus, as illustrated in FIG. 1B, a given item of multimedia content 500 may be understood as including both audio content 510 and video content 520. Archived multimedia content 500 can be processed as described herein, wherein such processing includes separation of audio content 510 from video content 520. On the other hand, client computing device 100 can be understood as receiving an observed audio signal 400, such as ambient sound provided by a radio broadcast, a music performance, or some other audio source, and providing a corresponding compressed audio signal 410 to content server 200 as "observed input". In response, content server 200 provides video content 520 to client computing device 100, wherein video content 520 is synchronized with observed audio signal 400. Thus it will be appreciated that multimedia content 500 may be received before, during, or after a particular audio signal 400 is observed. In certain embodiments, content server 200 receives and archives a large volume of multimedia content 500, thereby increasing the likelihood that observed audio signal 400 will correspond to audio content 510 that has been extracted from multimedia content 500 and processed by content server 200.

Client computing device 100 may comprise, for example, one or more devices selected from a desktop computer, a laptop computer, a workstation, a tablet computer, a smartphone, a set-top box, a server, or any other such computing device. A combination of different devices may be used in certain embodiments. In the example embodiment illustrated in FIG. 1A, client computing device 100 includes, among other things, a processor 110, a memory 120, an operating system 140, a communications module 150, an audio recorder 160, and a multimedia player 170. A bus 180 is also provided to allow for intra-device communications using, for example, communications module 150. Computer system 100 is optionally coupled to a network 300 to allow for communications with other computing devices and resources, such as content server 200, a dedicated graphics rendering server, or a cloud-based storage repository. Thus content server 200 can be local to network 300 or remotely coupled to network 300 by one or more other networks or communication channels. Other componentry and functionality not reflected in the schematic block diagram of FIG. 1A will be readily apparent in light of this disclosure, and it will be appreciated that the present disclosure is not intended to be limited to any particular hardware configuration. Thus other configurations and subcomponents can be used in other embodiments.

Processor 110 can be any suitable processor, and may include one or more coprocessors or controllers, such as a graphics processing unit or an audio processor, to assist in control and processing operations associated with client computing device 100. Memory 120 can be implemented using any suitable type of digital storage, such as one or more of a disk drive, a universal serial bus (USB) drive, flash memory, random access memory, or any suitable combination of the foregoing. Operating system 140 may comprise any suitable operating system, such as Google Android (Google, Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with client computing device 100, and therefore may also be implemented using any suitable existing or subsequently-developed platform. Communications module 150 can be any appropriate network chip or chipset which allows for wired or wireless connection to network 300 and other computing devices and resources. Network 300 may be a local area network (such as a home-based or office network), a wide area network (such as the Internet), or a combination of such networks, whether public, private, or both. In some cases access to resources on a given network or computing system may require credentials such as usernames, passwords, or any other suitable security mechanism.

Still referring to the example embodiment illustrated in FIG. 1A, audio recorder 160 comprises a microphone 162 and a signal compression module 164. Microphone 162 may comprise any suitable acoustic-to-electric transducer or sensor capable of converting an observed acoustic signal into an electrical signal. Microphone 162 may be used in conjunction with an analog-to-digital converter so as to convert a generated analog signal to a digital signal. Such conversion facilitates subsequent digital signal processing techniques. For example, in certain embodiments audio signal compression module 164 is used to store a digital signal in a compressed format, thereby making it easier to transmit the signal over network 300. Signal compression module can be configured to store an audio signal in a wide variety of file formats including the waveform audio file format (WAV), the audio interchange file format (AIFF), any suitable file format defined by the Moving Picture Experts Group (MPEG) including MPEG-4 and MP3, any suitable file format using advanced audio coding (AAC), or any other suitable file format capable of recording audio waveforms that represent sound recordings and/or other discrete audio samples. Audio recorder 160 is capable of recording observed audio signal 400 and producing a corresponding compressed audio signal 410.

In certain embodiments audio recorder 160 is configured to record and compress a predetermined duration of audio signal. For example, in one implementation any observed audio segment having sufficient duration to identify a matching archived audio segment can be used. To provide a more specific example, in one embodiment the observed audio segment is between about 5 seconds and about 60 seconds in duration, in another embodiment the observed audio segment is between about 10 seconds and about 30 seconds in duration, and in yet another embodiment the observed audio segment is between about 15 seconds and about 25 seconds in duration. In one specific embodiment the observed audio segment is 20 seconds in duration. In a modified embodiment audio recorder 160 is configured to record, compress, and stream an audio signal to content server 200 until such time as a valid return signal is received from content server 200.

In certain embodiments multimedia player 170 comprises a software application capable of rendering multimedia content. To this end, multimedia player 170 can be implemented or used in conjunction with a variety of suitable hardware components that can be coupled to or that otherwise form part of client computing device 100. Examples of such hardware components include a speaker 172 and a display 174. Examples of existing multimedia players which can be adapted for use with certain of the disclosed embodiments include Windows Media Player (Microsoft Corp., Redmond, Wash.), QuickTime (Apple Inc., Cupertino, Calif.), and Real-Player (RealNetworks, Inc., Seattle, Wash.). While multimedia players such as these are capable of playing audiovisual content, in certain embodiments multimedia player 170 can be configured to play only video content, such as video content 520 received from content server 200. In such embodiments speaker 172 may be considered optional. In certain embodiments operating system 140 is configured to automatically invoke multimedia player 170 upon receipt of video content 520. In embodiments where client computing device 100 is implemented in a client-server arrangement, such as illustrated in FIGS. 1A and 1B, at least some portions of multimedia player 170 can be provided to client computing device 100 using an applet, such as a JavaScript applet, or other downloadable module. Such a remotely accessible module can be provisioned in real-time in response to a request from client computing device 100 for access to a given application server having resources that are of interest to a user of client computing device 100.

Audio recorder 160 or multimedia player 170 can be configured to require a user to login before accessing the functionality described herein. Imposing such a requirement advantageously helps content providers collect additional information with respect to the audience receiving the audio and video content, thereby allowing content providers to target particular market segments with the streamed video content 520. This can be especially useful, for example, in the context of a radio advertiser that wishes to profile its audience and develop video content that is specifically intended for such audience.

Turning to FIG. 1B, content server 200 includes an archived content processing module 240 and an observed content processing module 250, both of which in turn include a fast Fourier transform (FFT) calculation sub-module 242, 252, and a hashing sub-module 246, 256. FFT calculation sub-modules 242, 252 are configured to compute a discrete Fourier transform by decomposing a sequence of values into components of different frequencies. In the context of archived content processing module 240, the Fourier transform can be computed based on archived input in the form of audio content 510, and can be understood as generating archived FFT data 244. Likewise, in the context of observed content processing module 250, the Fourier transform can be computed based on observed input in the form of compressed audio signal 410, and can be understood as generating observed FFT data 254. In certain embodiments FFT calculation sub-modules 242, 252 generate FFT data 244, 254 using the same algorithm, and thus can share software or hardware resources to perform such calculation.

Archived content processing module 240 and observed content processing module 250 also each include hashing sub-module 246, 256. Hashing sub-modules 246, 256 are configured to generate unique hash data based on the archived or observed FFT data 244, 254, respectively. Additional details regarding calculation of the unique hash data will be provided in turn. The resulting archived unique hash (AUH) data can be stored in an AUH repository 248, while the resulting observed unique hash (OUH) data can be stored in an OUH repository 258. The archived input processed by archived content processing module 240 also includes video content 520, as distinguished from observed content processing module 250 which may only receive compressed audio signal 410. Consequently, archived content processing module 240 can further be configured to separate video content 520 from audio content 510 and to store the separated video content 520 in a video content repository 249, as illustrated in FIG. 1B.

Still referring to the example embodiment illustrated in FIG. 1B, content server 200 further includes a hash matching module 270, a content manager 280, and a waveform manger 290. Hash matching module 270 is configured to systematically compare the AUH data stored in AUH repository 248 with the OUH data stored in observed content repository 258. Where compressed audio signal 410 is found to match audio content 510 processed by archived content processing module 240, comparison of the matching hash values will result in synchronization data 275. Such synchronization data 275 can be used to identify particular archived audio content 510 which is likely to correspond to observed audio signal 400 and can also be used to determine a time differential between the matching audio signals. Based on this time differential, waveform manager 290 can instruct content manager 280 to obtain the appropriate video content from video content repository 249. Video content 520 is then streamed to client computing device 100 via network 300, thereby enabling multimedia player 170 to render video content 520 such that it is synchronized with the ongoing ambient audio. This allows a user of client computing device 100 to enjoy audio-visual content where only audio content, such as received via a radio broadcast, might otherwise be available.

The embodiments disclosed herein can be implemented in various forms of hardware, software, firmware, or special purpose processors. For example, in one embodiment a non-transitory computer readable medium has instructions encoded therein that, when executed by one or more processors, cause one or more of the digital signal processing methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into a variety of different software applications, such as multimedia players, web browsers, and content editing applications. For example, a multimedia player installed on a smartphone can be configured to observe ambient audio and play corresponding video content based on the server-side audio matching techniques disclosed herein. The computer software applications disclosed herein may include a number of different modules, sub-modules, or other components of distinct functionality, and can provide information to, or receive information from, still other components and services. These modules can be used, for example, to communicate with peripheral hardware components, networked storage resources, or other external components. Other components and functionality not reflected in the illustrations will be apparent in light of this disclosure, and it will be appreciated that the present disclosure is not intended to be limited to any particular hardware or software configuration. Thus in other embodiments the components illustrated in FIGS. 1A and 1B may comprise additional, fewer, or alternative subcomponents.

The aforementioned non-transitory computer readable medium may be any suitable medium for storing digital information, such as a hard drive, a server, a flash memory, or random access memory. In alternative embodiments, the computer and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware and be used, and that the present disclosure is not intended to be limited to any particular system architecture.

Methodology: Audio Hashing

FIGS. 2A and 2B comprise a flowchart illustrating an example method 1000 for generating unique hash data based on an observed or an archived audio signal in accordance with certain of the embodiments disclosed herein. Audio hashing method 1000 includes a number of phases and sub-processes, the sequence of which may vary from one embodiment to another. However, when considered in the aggregate, these phases and sub-processes form a complete audio hashing process that is responsive to user commands in accordance with certain of the embodiments disclosed herein. Method 1000 can be implemented using the system architecture illustrated in FIGS. 1A and 1B. For example, in one implementation method 1000 is applied to observed input received in the form of compressed audio signal 410 observed by client computing device 100 using FFT calculation sub-module 252 and hashing sub-module 256. In another implementation, method 1000 is applied to archived input received in the form of audio content 510 processed by FFT calculation sub-module 242 and hashing sub-module 246. Other system architectures can be used in other embodiments, as will be apparent in light of this disclosure. Thus, the correlation of the various functionalities shown in FIGS. 2A and 2B to the specific components illustrated in FIGS. 1A and 1B are not intended to imply any structural or use limitations. Rather other embodiments may include varying degrees of integration where multiple functionalities are performed by one system or by separate systems. For example, in an alternative embodiment shared FFT calculation and hashing sub-modules are used to process both observed and archived audio signals. Thus other embodiments may have fewer or more modules and sub-modules depending on the granularity of implementation. Numerous variations and alternative configurations will be apparent in light of this disclosure.

Still referring to FIGS. 2A and 2B, the example audio hashing method 1000 commences with one of the FFT calculation sub-modules 242, 252 dividing the frequency spectrum of an audio signal into $n_{ba}$ distinct frequency bands. See reference numeral 1110 in FIG. 2A. For example, FIG. 3A conceptually illustrates an audible frequency spectrum ranging from 300 Hz to 21 kHz. This constitutes an analyzed spectrum AS spanning approximately 20.7 kHz. In other embodiments the analyzed spectrum may be smaller or larger depending on the demands of a particular application and the type of audio that is to be analyzed, and thus may range from as small as approximately 7 kHz to as large as approximately 63 kHz. This analyzed spectrum may be divided into a number of frequency bands $n_{ba}$ that is large enough to allow a variety of different frequency ranges to be processed independently, but that is small enough such that each of the frequency bands can be subjected to parallel processing given the processing capacity of content server 200. In one embodiment the analyzed spectrum is divided into seven frequency bands, although in other embodiments the analyzed spectrum may be divided into as few as three frequency bands or as many as fifteen frequency bands.

As illustrated in FIG. 3A, in an embodiment where a 20.7 kHz frequency spectrum is divided into $n_{ba}=7$ frequency bands, the frequency spectrum per band $f_{ba}$ is defined by $$f_{ba} = \frac{AS}{n_{ba}} = \frac{20.7 \text{ kHz}}{7 \text{ bands}} \approx 3 \text{ kHz band}^{-1}. \qquad (1)$$

The first frequency band can be understood as ranging from 300 Hz to 3 kHz, the second frequency band can be understood as ranging from 3 kHz to 6 kHz, the third frequency band can be understood as ranging from 6 kHz to 9 kHz, and so forth, as illustrated in FIG. 3A. Thus it is not necessary for each frequency band to cover an identical spectral range, and certain frequency bands may be slightly larger or smaller than other frequency bands.

Each of the frequency bands is, in turn, divided into $n_{bs}$ bin subsets per frequency band. See reference numeral 1120 in FIG. 2A. In particular, each of the frequency bands can be divided into a number of bin subsets $n_{bs}$ that is large enough to allow a variety of different frequency ranges to be analyzed independently, but that is small enough such that signal processing associated with the various bin subsets does not overwhelm the processing capacity of content server 200. In one embodiment each frequency band is divided into five bin subsets per band, although in other embodiments each frequency band is divided into as few as two bin subsets per band or as many as ten bin subsets per band. Each of the frequency bands is not necessarily divided into the same number of bin subsets. FIG. 3B, which provides an exploded view of the second frequency band illustrated in FIG. 3A, conceptually illustrates the division of this frequency band into $n_{bs}=5$ bin subsets per band. In this case, the frequency spectrum per bin subset $f_{bs}$ is defined by $$f_{bs} = \frac{f_{ba}}{n_{bs}} \approx \frac{3 \text{ kHz band}^{-1}}{5 \text{ bin subsets band}^{-1}} \approx 600 \text{ Hz bin subset}^{-1}. \qquad (2)$$

Thus the first bin subset can be understood as ranging from 3.0 kHz to 3.6 kHz, the second bin subset can be understood as ranging from 3.6 kHz to 4.2 kHz, the third bin subset can be understood as ranging from 4.2 kHz to 4.8 kHz, and so forth, as illustrated in FIG. 3B. Such subdivision can be performed in similar fashion for the other frequency bands as well.

The FFT techniques applied by FFT calculation sub-modules 242, 252 are based on a given sampling rate SR and window size WS. For example, in one embodiment FFT calculation sub-modules 242, 252 use a sampling rate of 44.1 kHz, although sampling rates ranging from 8 kHz to 5.64 MHz can be used in other embodiments, depending on the nature of the audio signal being analyzed. Likewise, in one embodiment FFT calculation sub-modules 242, 252 use a FFT window size having 4096 bins, although in window sizes ranging from 1024 bins to 16834 bins can be used in other embodiments, depending on the nature of the audio signal being analyzed and the processing capacity of content server 200. The ratio of the sampling rate to the window size defines the frequency resolution FR of the resulting FFT analysis. For instance, in the example embodiment illustrated in FIG. 3B, the frequency resolution FR is $$FR = \frac{SR}{WS} = \frac{44.1 \text{ kHz}}{4096 \text{ bins}} \approx 10.77 \text{ Hz bin}^{-1}. \qquad (3)$$

Thus where the first bin subset ranges from 3.0 kHz to 3.6 kHz, this spectral range can be understood as corresponding to bins ranging from 3.0 kHz÷10.77 Hz bin$^{-1}$=279th bin to 3.6 kHz÷10.77 Hz bin$^{-1}$=334th bin. In other words, the first bin subset illustrated in FIG. 3B is associated with bins having a bin index ranging from 279 to 334. Thus it will be appreciated that each point on the audible frequency spectrum illustrated in FIG. 3A can be associated with a particular frequency band, a particular bin subset, and a particular bin. In certain embodiments standard windowing operations, such as a Hanning window function, can be applied to reduce the extent of spectral leakage.

Each bin comprising the audible spectrum illustrated in FIG. 3A can be understood as being associated with an average power over the frequencies that fall within that bin. Therefore, of the several bins that comprise a given bin subset, as illustrated in FIG. 3B, at least one of those bins will have a maximum average power compared to the other bins comprising the bin subset. In this case, $b_p$ can be understood as the index of the bin having the maximum power in the pth bin subset. Thus, in certain embodiments, after the audible frequency spectrum has been divided into $n_{ba}$ frequency bands and $n_{bs}$ bin subsets per band, a bin index associated with the maximum power in each bin subset is identified. See reference numeral 1140 in FIG. 2A. Therefore each frequency band will be associated with $n_{bs}$ bin subsets and a corresponding set of $n_{bs}$ bin indices (in FIG. 3B $\{b_1, b_2, b_3, b_4, b_5\}$) corresponding to the maximum power within each bin subset.

Figure 4:
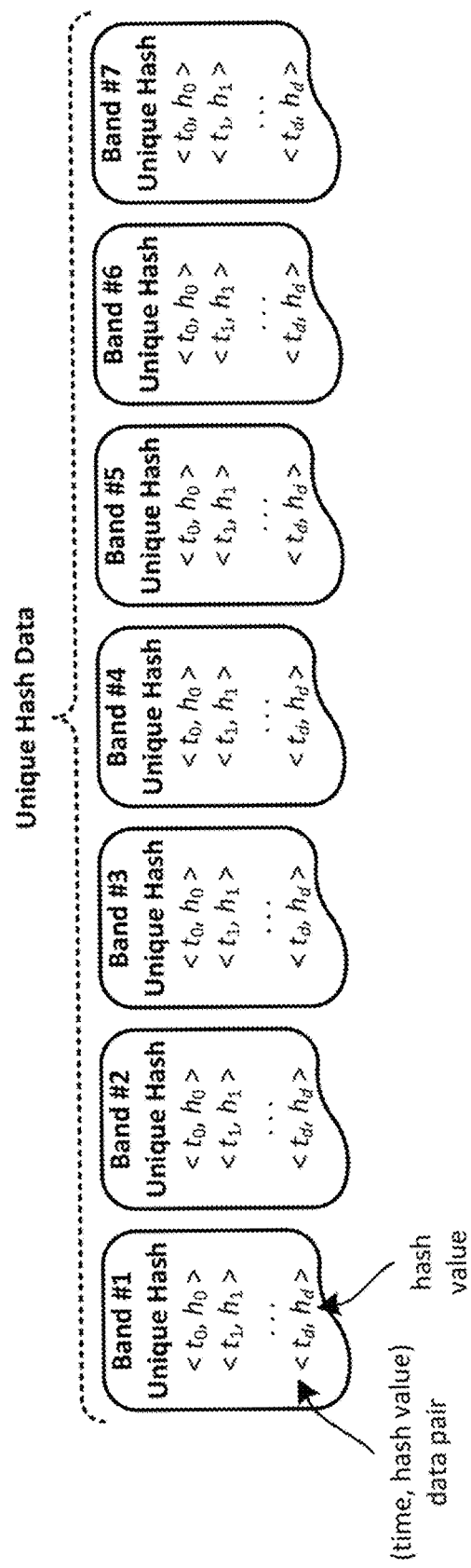
FIG. 4 conceptually illustrates the structure of the unique hash data that is produced by the hashing technique illustrated in FIGS. 2A and 2B, wherein the unique hash data comprises a plurality of unique hashes, each of which in turn comprises a plurality of (time, hash value) data pairs.

As illustrated in FIG. 1B, hashing sub-module 246 can be used to generate AUH data from audio content 510 that is extracted from archived multimedia content 500. Likewise, hashing sub-module 256 can be used to generate OUH data from compressed audio signal 410. FIG. 4 illustrates that, in either case, unique hash data can be understood as comprising $n_{ba}$ unique hashes corresponding to each of the $n_{ba}$ frequency bands into which the analyzed spectrum is divided. Each of the $n_{ba}$ unique hashes in turn comprises a set of (time, hash value) data pairs, wherein the quantity of (time, hash value) data pairs in each unique hash depends on the duration of the audio segment being hashed and the hashing time interval. The unique hash data can be generated faster if each of the $n_{ba}$ frequency bands are processed in parallel. Thus, in certain embodiments hashing sub-modules 246, 256 are configured to create $n_{ba}$ parallel processing threads for each of the $n_{ba}$ frequency bands. See reference numeral 1210 in FIG. 2B.

A sequence of unique hash values $\{h_0, h_1, h_2, \ldots h_d\}$ is calculated over the duration $t_d$ of the audio segment being analyzed for each of the $n_{ba}$ frequency bands. See reference numeral 1220 in FIG. 2B. These calculations can be performed by the $n_{ba}$ parallel processing threads. Each processing thread therefore can be understood as generating a set of (time, hash value) data pairs that comprise a particular one of the $n_{ba}$ unique hashes. The quantity of (time, hash value) data pairs in each unique hash depends on the duration of the audio segment being hashed and the hashing time interval. In one embodiment the hash value for a given frequency band at a given time depends on the $n_{bs}$ maximum power bin indices at the given time for the $n_{bs}$ bin subsets comprising the given band. For example, where each frequency band comprises five bin subsets (such as illustrated in FIG. 3B) the hash value corresponding to time $t_0$ depends on the set of bin indices $\{b_1, b_2, b_3, b_4, b_5\}$ associated with the maximum power for each of the five bin subsets at time $t_0$. In one embodiment different hash values are calculated at one-second intervals, although more or less frequent intervals can be used in other embodiments.

Any of a variety of suitable hashing functions can be used to generate a hash value from the $n_{bs}$ maximum power bin indices. For example in one embodiment a unique hash value h can be defined by a powered sum of the bin indices associated with the maximum power for each of the $n_{bs}$ bin subsets, such as:

$$h(b_1, b_2, b_3, b_4, b_5) = \{b_5 - [(b_5 \% 3) > 0 ? 2 : 0]\}10^{11} + \quad (4)$$
$$\{b_4 - [(b_4 \% 3) > 0 ? 2 : 0]\}10^8 + \{b_3 - [(b_3 \% 3) > 0 ? 2 : 0]\}10^5 +$$
$$\{b_2 - [(b_2 \% 3) > 0 ? 2 : 0]\}10^2 + \{b_1 - [(b_1 \% 3) > 0 ? 2 : 0]\},$$

wherein the expression (logical) ? a:b evaluates to a if the logical expression is true, and evaluates to b if the logical expression is false. Equation (4) produces a unique hash value based on the set of bin indices $\{b_1, b_2, b_3, b_4, b_5\}$ associated with the maximum power for each of the five bin subsets at a given time. Bin indices $b_p$, $b_p+1$, and $b_p+2$ are treated the same to introduce a degree of tolerance into the hashing process. This degree of tolerance can be increased, decreased, or wholly omitted in other embodiments. The hashing calculation provided by Equation (4) can be modified in alternative embodiments, and thus it will be appreciated that other calculations can be used in such embodiments. For example, in an alternative embodiment the hash value is calculated based on a subset of the $n_{bs}$ maximum power bin indices without any degree of tolerance. One example of such a hashing function is provided by:

$$h(b_1,b_2,b_3,b_4)=[b_4-(b_4\%3)]10^8+[b_3-(b_3\%3)]10^5+[b_2-(b_2\%3)]10^2+[b_1-(b_1\%3)]. \quad (5)$$

Once generated, the $n_{ba}$ unique hashes are stored in an appropriate hash repository. See reference numeral 1230 in FIG. 2B. For example, where method 1000 is applied to observed input received in the form of compressed audio signal 410 observed by client computing device 100, the resulting $n_{ba}$ unique hashes can be stored in OUH repository 258. FIG. 2B illustrates an example data structure which may be used in conjunction with OUH repository 258, wherein each of the $n_{ba}$ bands is associated with a set of (time, hash value) data pairs. On the other hand, where method 1000 is applied to archived input received in the form of audio content 510, the resulting $n_{ba}$ unique hashes can be stored in AUH repository 248. FIG. 2B also illustrates an example data structure which may be used in conjunction with AUH repository 248, wherein each of the $n_{ba}$ bands is associated with (a) a set of (time, hash value) data pairs and (b) an AudioID_q parameter. The AudioID_q parameter corresponds to a qth audio segment that has been processed by archived content processing module 240. Thus while OUH repository 258 can be understood as storing unique hash data corresponding to a single observed audio segment, AUH repository 248 can be understood as storing unique hash data corresponding to a plurality of archived audio segments. Once the unique hash data has been stored in an appropriate hash repository, the hashing method 1000 may be considered complete.

In certain embodiments archived content processing module 240 can be used to apply hashing methodology 1000 to a large quantity of multimedia content 500 before it is attempted to synchronize an observed audio signal with archived video content. In particular, processing a large quantity of multimedia content 500 increases the likelihood that an appropriate match will be found for a subsequently-observed audio segment. In such embodiments archiving multimedia content 500 comprises (a) receiving multimedia content 500 that comprises audio content 510 and video content 520 which are synchronized; (b) separating audio content 510 from video content 520; (c) generating AUH data based on audio content 510; and (d) storing video content 520 in video content repository 249. Video content 520 can be indexed by the same AudioID_q parameter used in AUH repository 248, such that once a particular AudioID_q parameter is identified as matching an observed audio segment, the corresponding video content can be retrieved. Compilation of AUH data enables such data to be used in a subsequent matching process, as will be described in turn. While certain embodiments involve compilation of a large quantity of AUH data before the matching and synchronization processes are attempted, it will be appreciated that in other embodiments multimedia content 500 can continue to be received and processed even after matching and synchronization commences.

Methodology: Audio Matching and Video Synchronization

FIGS. 5A through 5G comprise a flowchart illustrating an example method 2000 for synchronizing observed audio signal 400 with archived video content 520 that is associated with audio content 510 matching observed audio signal 400 in accordance with certain of the embodiments disclosed herein. Synchronization and matching method 2000 includes a number of phases and sub-processes, the sequence of which may vary form one embodiment to another. However, when considered in the aggregate, these phases and sub-processes form a complete synchronization and matching process that is responsive to user commands in a accordance with certain of the embodiments disclosed herein. Method 2000 can be implemented using the system architecture illustrated in FIGS. 1A and 1B. For example, in one implementation method 2000 is applied to observed unique hash data generated by observed content processing module 250. Other system architectures can be used in other embodiments, as will be apparent in light of this disclosure. Thus, the correlation of the various functionalities shown in FIGS. 5A through 5G to the specific components illustrated in FIGS. 1A and 1B are not intended to imply any structural or use limitations. Rather other embodiments may include varying degrees of integration where multiple functionalities are performed by one system or separate systems. Thus other embodiments may have fewer or more modules and sub-modules depending on the granularity of implementation. Numerous variations and alternative configurations will be apparent in light of this disclosure.

In certain embodiments the example synchronization and matching method 2000 commences once observed content processing module 250 generates OUH data based on an observed audio signal 400. Because significant portions of method 2000 are applied individually to the $n_{ba}$ frequency bands comprising the audible spectrum, the processing associated with method 2000 can be expedited through the use of parallel processing techniques. Therefore in certain embodiments hash matching module 270 is configured to create $n_{ba}$ parallel processing threads for each of the $n_{ba}$ frequency bands. See reference numeral 2110 in FIG. 5A. Thus, it will be appreciated that at least some the subsequent processing techniques, which are described herein as generally being applied to a specific ith frequency band of the observed audio segment, can be applied to all $n_{ba}$ frequency bands simultaneously.

Parallel processing over $n_{ba}$ frequency bands increases the likelihood that frequencies will be hashed where a particular audio signal has strong frequency power. For example, a first archived audio segment may have strong frequency power in a first frequency band, while a second archived audio segment may have strong frequency power in a second frequency band. By hashing an observed audio segment in both frequency bands, this ensures that AUH data from a strong frequency power spectrum of both the first and second archived audio segments is compared with OUH data from the same frequency spectrum of the observed audio segment.

Hash matching module 270 is configured to receive an observed unique hash for the ith frequency band of an observed audio segment. See reference numeral 2120 in FIG. 5A. As described and illustrated herein, the observed unique hash comprises a set of (time, hash value) data pairs derived from a single observed audio segment. In contrast, AUH repository 248 includes AUH data associated with an arbitrary quantity of archived audio segments A. That is, A is defined as the number of archived audio segments having AUH data stored in AUH repository 248. See reference numeral 2140 in FIG. 5A. Audio segment counting parameter A' is set such that A'=1. See reference numeral 2150 in FIG. 5A. The archived unique hash for the ith frequency band of the A'th audio segment is then retrieved. See reference numeral 2160 in FIG. 5A. Like the observed unique hash, the archived unique hash also comprises a set of (time, hash value) data pairs derived from the ith frequency band of an audio segment.

Because the observed and archived audio segments are not necessarily the same duration, the observed and archived hashes may have different quantities of (time, hash value) data pairs. For instance, FIG. 5A illustrates the observed unique hash as having a duration $t_{do}$ while the archived unique hash has a duration $t_{da}$. In general, $t_{do}$ will be less than $t_{da}$ because the observed audio segment is a short recording of the complete archived audio segment, although this will not necessarily be the case. Regardless of the relative lengths of the observed and archived audio segments, separate counting parameters are used to iterate over the hash values comprising the observed and archived unique hashes, thereby making it possible to compare all of the hash values of the observed unique hash to all of the hash values of the archived unique hash. Specifically, observed unique hash value counting parameter j is set such that j=0. See reference numeral 2170 in FIG. 5A. And archived unique hash value counting parameter k is set such that k=0. See reference numeral 2180 in FIG. 5A.

Once the counting parameters j and k are set, the jth hash value of the observed unique hash ($h_j$) is compared to the kth hash value of the archived unique hash that is associated with the A'th archived audio segment ($h_k$). See reference numeral 2210 in FIG. 5B. If $h_j=h_k$, the time $t_j$ that corresponds to hash value $h_j$ and the time $t_k$ that corresponds to hash value $h_k$ are stored in a synchronization map 275a for the A'th audio segment, wherein synchronization map 275a is keyed by the matching hash values $h_j=h_k$. See reference numeral 2212 in FIG. 5B. As illustrated in FIG. 6, synchronization map 275a can be understood as forming part of synchronization data 275 that is generated by hash matching module 270. More specifically, synchronization map 275a includes M matching hash pairs $\{(h_{j1}=h_{k1}), (h_{j2}=h_{k2}), \ldots, (h_{jM}=h_{kM})\}$, each of which is keyed to L time pairs $\{(t_{j1}, t_{k1}), (t_{j2}, t_{k2}), \ldots, (t_{jL}, t_{kL})\}$. Because the observed and archived unique hashes may match at more than one time, a given matching hash pair may be keyed to a plurality of (observed, archived) time pairs.

Regardless of whether or not $h_j=h_k$, the archived unique hash value counting parameter k is incremented by one. See reference numeral 2220 in FIG. 5B. Once the archived unique hash value counting parameter k has been appropriately incremented, it is determined whether all of the archived unique hash values associated with the A'th archived audio segment have been compared to the jth hash value of the observed unique hash. See reference numeral 2230 in FIG. 5B. In particular, if the incremented archived unique hash counting parameter k is less than or equal to the total quantity of archived unique hash values associated with the A'th archived audio segment |AUH(A')|, then the incremented kth hash value of the archived unique hash ($h_k$) can be compared to the jth hash value of the observed unique hash ($h_j$). See reference numeral 2210 in FIG. 5B.

However, if the incremented archived unique hash counting parameter k is greater than the total quantity of archived unique hash values associated with the A'th archived audio segment |AUH(A')|, this indicates that all of the archived unique hash values for audio segment A' have been compared to the jth hash value of the observed unique hash. In this case, the observed unique hash value counting parameter j is incremented by one. See reference numeral 2240 in FIG. 5B. Once the observed unique hash value counting parameter j has been appropriately incremented, it is determined whether all of the observed unique hash values have been compared to the hash values comprising the archived unique hash. See reference numeral 2250 in FIG. 5B. In particular, if the incremented observed unique hash counting parameter j is less than or equal to the total quantity of observed unique hash values |OUH|, then the archived unique hash value counting parameter k is reset such that k=0. See reference numeral 2252. The zeroth hash value of the archived unique hash ($h_0$) is then compared to the incremented jth hash value of the observed unique hash ($h_j$). See reference numeral 2210 in FIG. 5B. On the other hand, if the incremented observed unique hash counting parameter j is greater than the total quantity of observed unique hash values |OUH|, this indicates that all of the archived unique hash values for audio segment A' have been compared to all of the observed unique hash values. Thus FIG. 5B illustrates a process for comparing all archived unique hash values for audio segment A' to a selected observed unique hash value, and repeating this comparison for all observed unique hash values.

If all of the archived unique hash values for audio segment A' have been compared to all of the observed unique hash values, it is determined whether or not synchronization map 275*a* is empty. See reference numeral 2260 in FIG. 5B. If synchronization map 275*a* is empty, this indicates that no match exists between the ith band of the observed audio segment and the ith band of the A'th archived audio segment. See reference numeral 2310 in FIG. 5C. In this case, the audio segment counting parameter A' is incremented by one. See reference numeral 2320 in FIG. 5C. Once the audio segment counting parameter A' is incremented, it is determined whether all of the archived audio segments have been compared to the observed audio segment. See reference numeral 2330 in FIG. 5B. In particular, if the incremented audio segment counting parameter A' is less than or equal to the total quantity of archived audio segments A, then the archived unique hash for the ith frequency band of the incremented A'th audio segment is retrieved. See reference numeral 2160 in FIG. 5A.

Figure 5B:
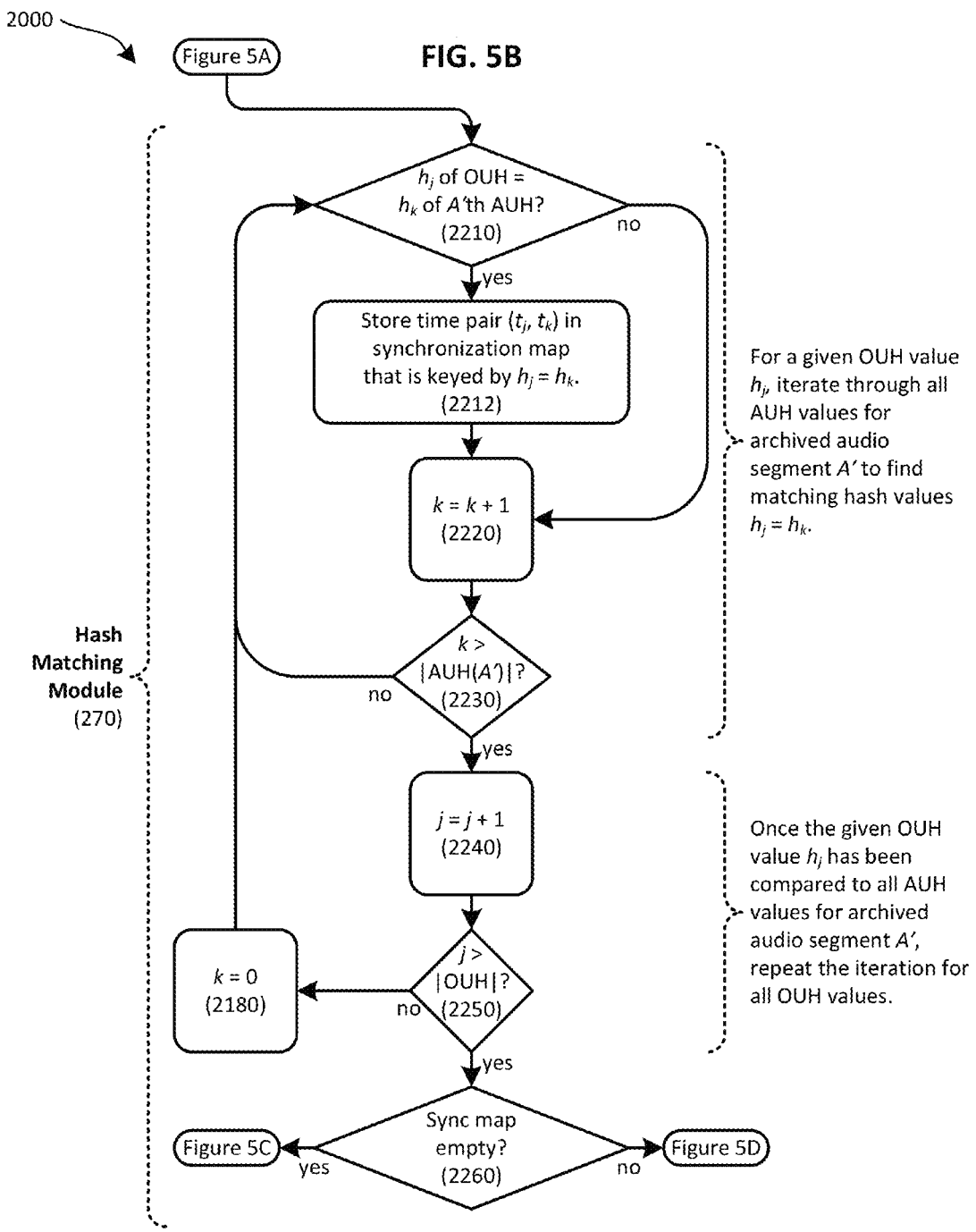
Figure 6:
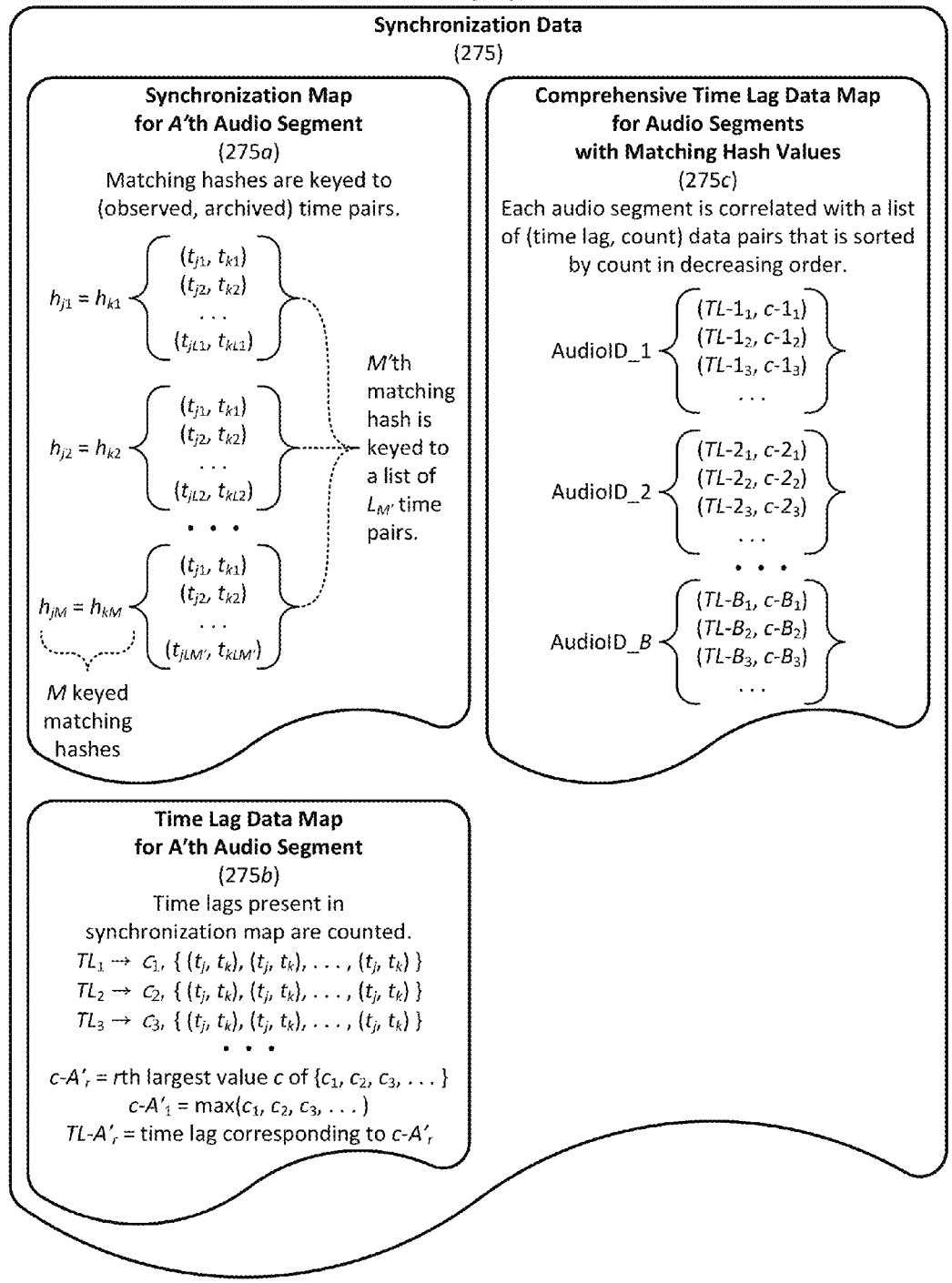
FIG. 6 conceptually illustrates certain data structures containing synchronization data which is used as part of the synchronization methodology illustrated in FIGS. 5A through 5G.

Referring again to reference numeral 2260 in FIG. 5B, if synchronization map 275*a* is not empty, this indicates that at least one observed unique hash value matches at least one archived unique hash value. In this case, waveform manager 290 can be used to derive a time lag between the observed and archived audio segments based on the data provided in synchronization map 275*a*. To this end, M is defined as the number of keyed matching hash values contained in synchronization map 275*a*. See reference numeral 2140 in FIG. 5D. Matching hash value counting parameter M' is set such that M'=1. See reference numeral 2420 in FIG. 5D. Similarly, $L_{M'}$ is defined as the number of time pairs associated with the M'th keyed matching hash value. See reference numeral 2430 in FIG. 5D. Time pair counting parameter $L'_{M'}$ is set such that $L'_{M'}$=1. See reference numeral 2440 in FIG. 5D.

Figure 5E:
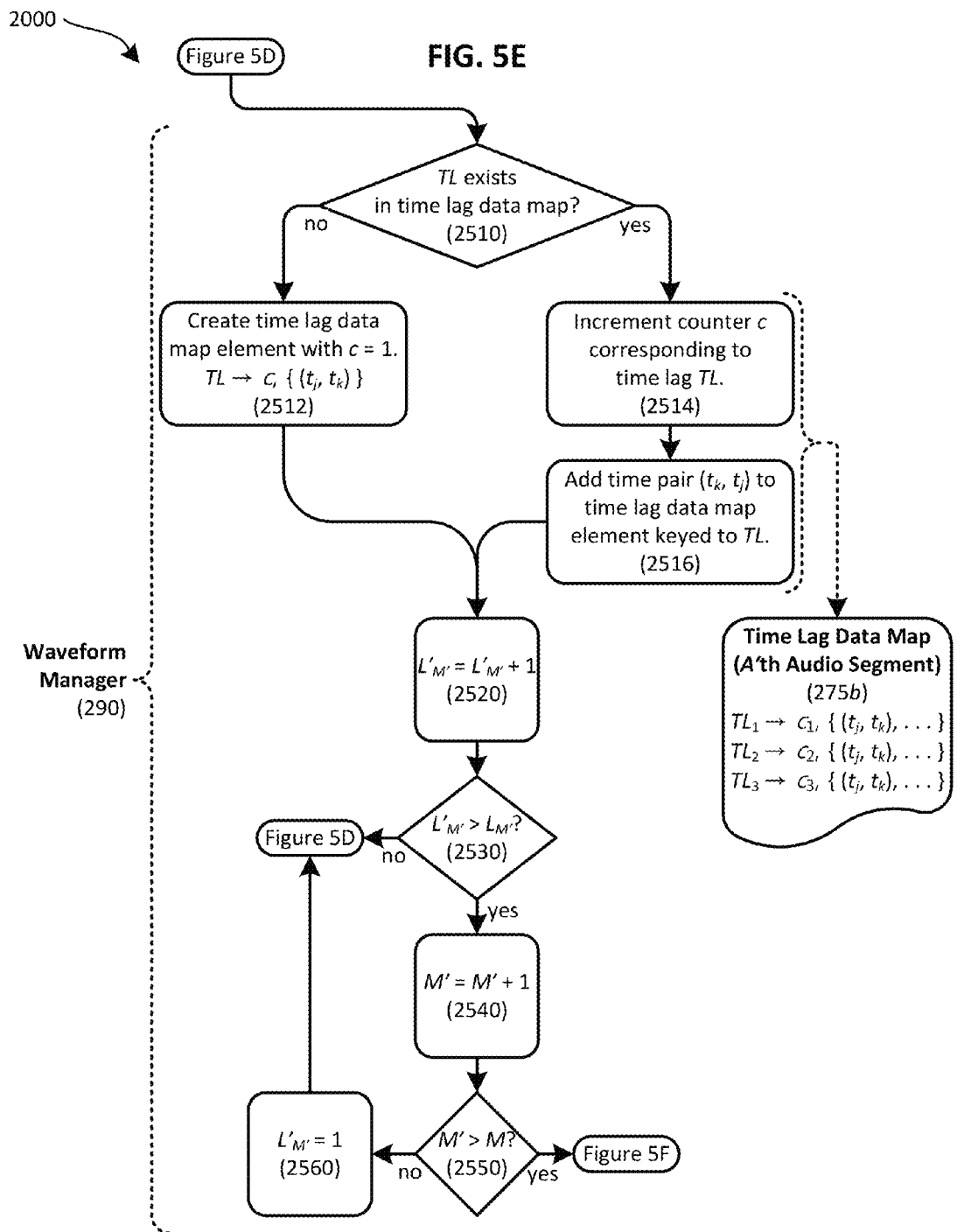

Once the counting parameters M' and $L'_{M'}$ are set, the time lag TL for the $L'_{M'}$th time pair in the list keyed to the M'th keyed matching hash value is evaluated. See reference numeral 2450 in FIG. 5D. For example, in one embodiment time lag TL is defined as the difference between the two time pairs ($t_j$, $t_k$), such that TL=$t_k$-$t_j$. Once TL is evaluated, it is determined whether TL exists in a time lag data map for A'th audio segment 275*b*. See reference numeral 2510 in FIG. 5E. As illustrated in FIGS. 5E and 6, time lag data map for A'th audio segment 275*b* can be understood as forming part of synchronization data 275 that is generated by waveform manager 290. More specifically, time lag data map for A'th audio segment 275*b* includes a listing of the time lag values $TL_1$, $TL_2$, $TL_3$, . . . , each of which is keyed to (a) a listing of the time pairs that correspond to a given time lag TL, and (b) a count c of the number of time pairs in the listing. Thus, as illustrated in FIG. 6, time lag data map for A'th audio segment 275*b* can be understood as having a structure:

$$TL_1 \rightarrow c_1, \{(t_j,t_k),(t_j,t_k),\ldots,(t_j,t_k)\}$$

$$TL_2 \rightarrow c_2, \{(t_j,t_k),(t_j,t_k),\ldots,(t_j,t_k)\}$$

$$TL_3 \rightarrow c_3, \{(t_j,t_k),(t_j,t_k),\ldots,(t_j,t_k)\} \quad (6)$$

It will therefore be appreciated that because multiple time pairs may evaluate to the same time lag TL, a given time lag TL may be keyed to a plurality of time pairs.

If the evaluated time lag TL does not already exist in time lag data map for A'th audio segment 275*b*, a time lag data map element that corresponds to TL and that has a counter c=1 and a one-element list $\{(t_j, t_k)\}$ is created. See reference numeral 2512 in FIG. 5E. If, on the other hand, the evaluated time lag TL already exists in time lag data map for A'th audio segment 275*b*, the counter c corresponding to time lag TL is incremented. See reference numeral 2514 in FIG. 5E. The time pair ($t_j$, $t_k$) is also added to the list corresponding to time lag TL=$t_k$-$t_1$. See reference numeral 2516 in FIG. 5E.

Regardless of whether or not the evaluated time lag TL already exists in time lag data map for A'th audio segment 275*b*, the time pair counting parameter $L'_{M'}$ is incremented by one. See reference numeral 2520 in FIG. 5E. Once the time pair counting parameter $L'_{M'}$ is incremented, it is determined whether all of the time pairs associated with the M'th keyed matching hash value have been converted to a time lag which has been indexed in time lag data map for A'th audio segment 275*b*. See reference numeral 2530 in FIG. 5E. In particular, if the incremented time pair counting parameter $L'_{M'}$ is less than or equal to the total number of time pairs associated with the M'th keyed matching hash value $L_{M'}$, then the time lag TL corresponding to the incremented $L'_{M'}$th time pair is evaluated. See reference numeral 2450 in FIG. 5D.

However, if the incremented time pair counting parameter $L'_{M'}$ is greater than the total number of time pairs associated with the M'th keyed matching hash value $L_{M'}$, this indicates that all of the time pairs associated with the M'th keyed matching hash value have been correlated with a time lag TL indexed in time lag data map for A'th audio segment 275*b*. In this case, the matching hash value counting parameter M' is incremented by one. See reference numeral 2540 in FIG. 5E. Once the matching hash value counting parameter M' is incremented, it is determined whether time pairs for all of the matching hash values have been correlated with corresponding time lags TL which are indexed in time lag data map for A'th audio segment 275*b*. See reference numeral 2550 in FIG. 5E. In particular, if the incremented matching hash value counting parameter M' is less than or equal to the total number of keyed matching hash values contained in synchronization map 275a, then the time pair counting parameter $L'_{M'}$ is reset such that $L'_{M'}=1$. See reference numeral 2560. The time lag TL for the first time pair of the M'th keyed matching hash value is then evaluated. See reference numeral 2450 in FIG. 5D.

On the other hand, if the incremented matching hash value counting parameter M' is greater than the total number of keyed matching hash values contained in synchronization map 275a, this indicates that all of the time pairs contained in synchronization map 275a have been correlated with a time lag TL indexed in time lag data map for A'th audio segment 275b. In this case time lag data map for A'th audio segment 275b is sorted by decreasing count c, such that the maximum count $c-A'_1$ is listed first. See reference numeral 2610 in FIG. 5F. In general, a count $c-A'_r$ can be understood as the rth largest value of $\{c_1, c_2, c_3, \ldots\}$ as listed in time lag data map for A'th audio segment 275b. Thus $c-A'_1=\max(c_1, c_2, c_3, \ldots)$ for audio segment A'. Sorting the time lag data map for A'th audio segment allows the most frequently observed time lag for audio segment A' to be easily identified. In general, a time lag $TL-A'_r$ can be understood as the time lag associated with the count $c-A'_r$ as listed in time lag data map for A'th audio segment 275b. Thus $TL-A'_1$ is the most frequently observed time lag for audio segment A'.

Figure 5F:
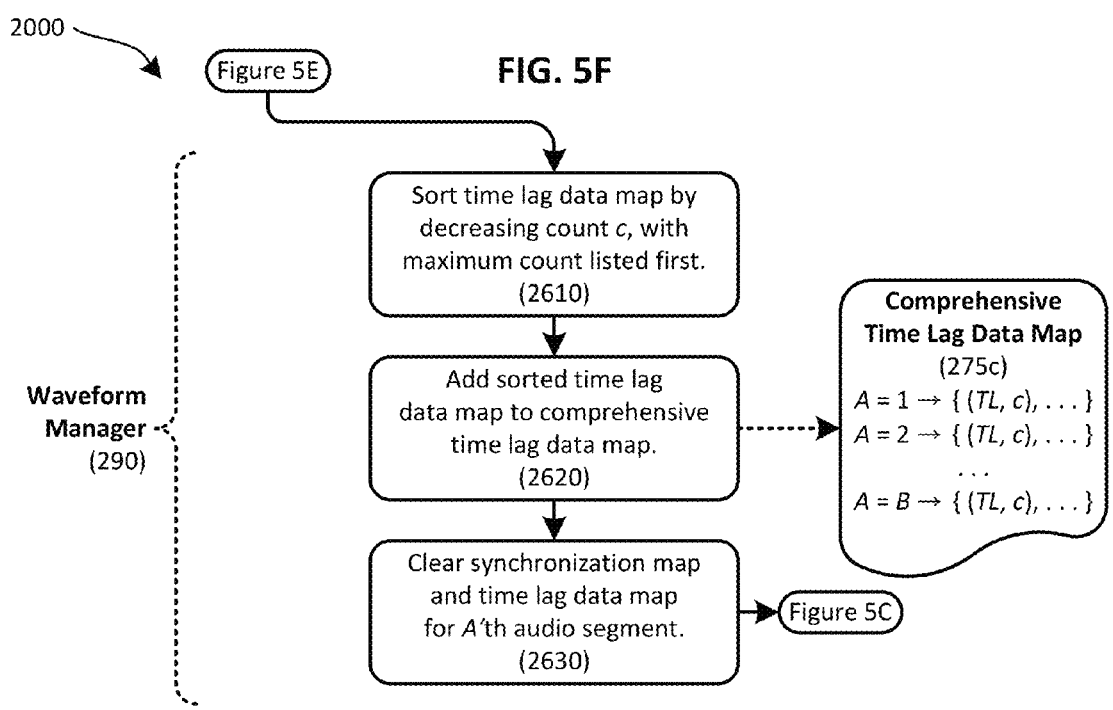

In certain embodiments the sorted time lag data map for the A'th audio segment is added to a comprehensive time lag data map 275c. See reference numeral 2620 in FIG. 5F. As illustrated in FIGS. 5F and 6, comprehensive time lag data map 275c can be understood as forming part of synchronization data 275 that is generated by waveform manager 290. More specifically, comprehensive time lag data map 275c includes the sorted listing of (time lag, count) data pairs for B audio segments, where B is the number of audio segments having an archived unique hash value that matches an observed unique hash value. In other words, each of the B audio segments is keyed to a sorted list of (time lag, count) data pairs, thus allowing the most frequently observed time lag for each matching audio segment to be easily identified. Once the sorted time lag data map has been added to comprehensive time lag data map 275c, analysis of audio segment A' is considered compete. Thus synchronization map 275a and time lag data map for A'th audio segment 275b, both of which only contain data specific to audio segment A', are cleared. See reference numeral 2630 in FIG. 5F. Audio segment counting parameter A' is then incremented by one. See reference numeral 2320 in FIG. 5C. Once the audio segment counting parameter A' is incremented, it is determined whether all of the archived audio segments have been compared to the observed audio segment. See reference numeral 2330 in FIG. 5B. In particular, if the incremented audio segment counting parameter A' is less than or equal to the total quantity of archived audio segments A, then the archived unique hash for the ith frequency band of the incremented A'th audio segment is retrieved. See reference numeral 2160 in FIG. 5A. Processing of the incremented A'th audio segment follows as described herein.

On the other hand, if the incremented audio segment counting parameter A' is greater than the total quantity of archived audio segments A, this indicates that the ith band of all A archived audio segments has been compared to the ith band of the observed audio segment. The results of these comparisons are provided in comprehensive time lag data map 275c. Waveform manager 290 can be configured to determine whether comprehensive time lag data map 275c is empty. See reference numeral 2340 in FIG. 5C. If this is the case, the ith band of the observed audio segment did not match the ith band of any archived audio segment. See reference numeral 2344 in FIG. 5C. In this case, the ith band of the observed audio segment is not subjected to further processing.

However, if comprehensive time lag data map 275c is not empty and contains (time lag, count) data pairs for each of the archived audio segments B having matching hash values, then waveform manager 290 is configured to end parallel processing of the $n_{ba}$ bands. See reference numeral 2346 in FIG. 5C. Taken as a whole, this parallel processing will produce anywhere from one to $n_{ba}$ comprehensive time lag data maps 275c for the $n_{ba}$ bands of the observed audio segment. In some cases fewer than $n_{ba}$ comprehensive time lag data maps will be generated, such as where one or more of the bands does not produce any matches between the observed and archived audio segments. When the parallel processing of the $n_{ba}$ bands is complete, waveform manager is configured to extract the one or more comprehensive time lag data maps 275c from synchronization data 275. See reference numeral 2710 in FIG. 5G.

Figure 7:
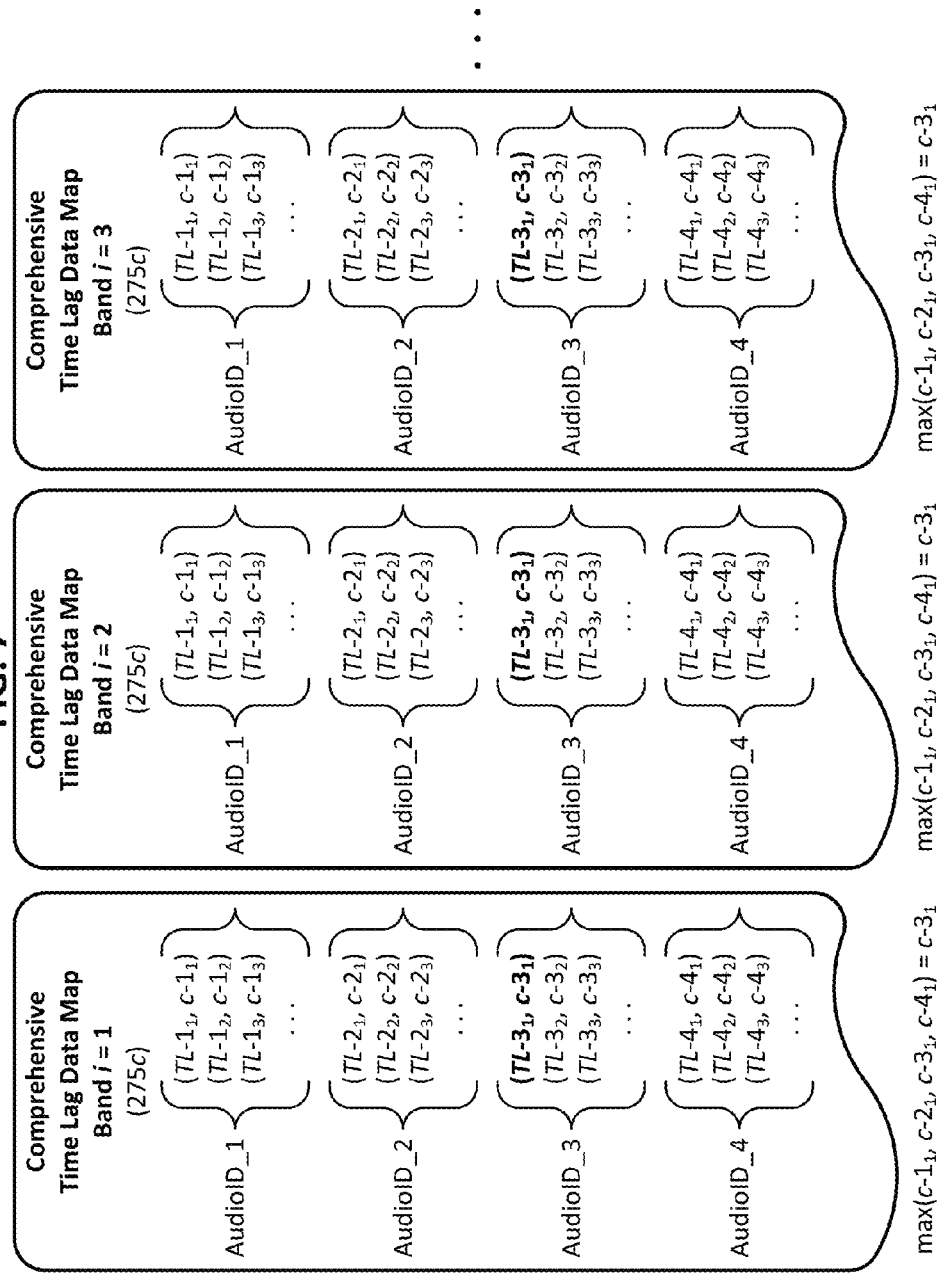
FIG. 7 conceptually illustrates a plurality of comprehensive time lag data maps produced by parallel processing a plurality of audio segment bands as part of the synchronization methodology illustrated in FIG. 5A through 5G.

FIG. 7 illustrates examples of comprehensive time lag data maps 275c which may be extracted from synchronization data 275. Each comprehensive time lag data map 275c is associated with one of the $n_{ba}$ bands subjected to parallel processing as described herein. In addition, each comprehensive time lag data map 275c includes a sorted listing of (time lag, count) data pairs for each of the B audio segments having an archived unique hash value that matches an observed unique hash value. For instance, B=4 in the example embodiment illustrated in FIG. 7, and therefore each comprehensive time lag data map 275c includes four sorted listings of (time lag, count) data pairs. The first data pair included in each sorted list will be associated with the maximum count $c-B'_1$, wherein $1 \leq B' \leq B$.

In certain embodiments the audio segment associated with the maximum count $c_{max}$ present in a given comprehensive time lag data map 275c is identified. See reference numeral 2720 in FIG. 5G. This audio segment, which may also be referred to as the "most common" audio segment, can be identified by determining $c_{max}=\max(c-1_1, c-2_1, c-3_1, \ldots, c-B_1)$. In the example embodiment illustrated in FIG. 7, where B=4, $c_{max}=\max(c-1_1, c-2_1, c-3_1, c-4_1)=c-3_1$ for each of the $n_{ba}$ bands under analysis. Thus count $c-3_1$ and its corresponding time lag TL-3 are indicated in boldface in FIG. 7. Audio segment 3 is thus identified as being the most common audio segment in this particular example. Each analyzed band may or may not identify the same most common audio segment as being associated with $c_{max}$. Thus, once the most common audio segment is identified for each of the analyzed bands, it is determined whether all of the bands identify the same audio segment as being most common. See reference numeral 2730 in FIG. 5G. It will be appreciated that in alternative embodiments, this determination can be modified such that a majority or a predetermined threshold portion of the bands identify the same audio segment as being most common.

Where different bands identify different audio segments as being most common, it may not be possible to match the observed audio segment with an archived audio segment with a threshold confidence level. See reference numeral 2732. In this case, the analysis ends without identifying a matching archived audio segment, although a user may wish to repeat the analysis with a longer observed audio segment. Thus in some cases content server 200 is configured to request client computing device 100 to send additional observed audio data in response to a detected failure to identify a matching archived audio segment. On the other hand, where all of the bands identify the same archived audio segment as being most common, or in alternative embodiments where a majority or a threshold plurality of the bands identify an particular audio segment as being most common, the identified most common audio segment can be considered a positive match with the observed audio segment. See reference numeral 2734 in FIG. 5G.

Once an archived audio segment is identified as a positive match to the observed audio segment, it is determined whether the identified match is sufficiently precise to begin streaming video content 520 to client computing device 100 such that the streamed video content 520 is synchronized with observed audio signal 400. For example, even where a positive match is identified, ambiguity may exist with respect to the appropriate time differential between the observed and archived audio segments. To provide a specific example, this ambiguity may arise where a repeating refrain is present in the observed audio segment, in which case it may be unclear which repetition of the refrain was actually observed. Whether such ambiguity exists may be established by determining whether different time lag values are associated with the maximum observed count $c_{max}$. In particular, where the maximum observed count $c_{max}$ is associated with multiple time lags, this suggests that the observed audio segment matches more than one portion of the archived audio segment. This may occur, for instance, in the example embodiment illustrated in FIG. 7 where $TL-3_1=TL-3_2$.

Thus, in certain embodiments it is determined whether multiple time lag values are associated with the maximum observed count $c_{max}$. See reference numeral 2740 in FIG. 5G. Where this is the case, additional audio is observed to resolve the ambiguity. See reference numeral 2746 in FIG. 5G. Once the additional audio is observed, parallel processing of the newly observed audio segment can be performed in the same manner as initially performed, except that only a single archived audio segment is compared to the observed audio segment. See reference numeral 2748 in FIG. 5G. That is, the method commencing at reference numeral 2110 in FIG. 5A is repeated with A=1. On the other hand, if the maximum observed count $c_{max}$ is associated with a single time lag value, this time lag is added to the most recently observed audio timestamp. See reference numeral 2742 in FIG. 5G. Content manager 280 then retrieves video content 520 from video content repository 249 based on the sum of the most recently observed audio timestamp and the time lag value. See reference numeral 2743 in FIG. 5G. The extracted video content 520 is then streamed to client computing device 100. See reference numeral 2744 in FIG. 5G. Because video content 520 is streamed at a temporal offset based on the sum of the most recently observed audio timestamp and the time lag value, the video content will appear to be synchronized with the ongoing ambient audio.

In an alternative embodiment the retrieved video content 520 is not streamed to client computing device 100, but rather is sent as a bulk data transfer. In such case client computing device 100 can be configured to compute which portion of the received video content 520 to display at a given time. Such a configuration may be particularly advantageous in applications where a limited quantity of visual assets are to be displayed at certain points of an audio segment. For example, a 60-second radio advertisement may call for three still slides to be displayed at certain points in time. Once the audio associated with the radio advertisement is recognized, the three still slides can be downloaded to client computing device 100 and displayed at the appropriate time points. Such embodiments reduce bandwidth associated with ongoing data streaming between client computing device 100 and content server 200.

CONCLUSION

The various embodiments disclosed herein advantageously provide media playback that is responsive to the environment in which the media is to be consumed. This allows users to consume video content that corresponds to observed audio, wherein the video content is synchronized with the observed audio. The methodologies disclosed herein enable a user to enjoy audiovisual content where only audio content, such as received via a radio broadcast, might otherwise be available. Not only does this enhance user experience, but it also provides a valuable way for advertisers to convert an audio impression, such as a radio advertisement, into an audiovisual impression. It also allows video content to be streamed to content consumers on an "on-demand" basis, thereby addressing the difficulty of streaming content to different consumers who receive content at different times, as in the case of consumers located in different time zones. As described herein, in certain embodiments the audio/video synchronization functionality is provided by processing modules executing at content server 200, such that any applications executing on client computing device 100 do not require significant processing resources. Thus, from a user's perspective, the functionality described herein can be achieved using, for example, portable communicating devices such as smartphones and tablet computers.

For instance, FIG. 8 is a flowchart illustrating an example method 3000 for synchronizing an observed audio signal with archived video content having an audio track that matches the observed audio signal. Method 3000 commences with receiving an observed audio segment from a client computing device. See reference numeral 3100 in FIG. 8, as well as FIG. 1, which illustrates that client computing device 100 can be understood as receiving an observed audio signal 400, such as ambient sound provided by a radio broadcast, a music performance, or some other audio source. Method 3000 continues with generating a plurality of hash values corresponding to the observed audio segment. See reference numeral 3200 in FIG. 8, as well as FIGS. 2A and 2B, which illustrate an example method for generating unique hash data based on an observed audio signal. Method 3000 continues with performing a comparison of each of the plurality of hash values to a plurality of archived hash values, wherein each of the plurality of archived hash values is associated with one of a plurality of archived audio segments. See reference numeral 3300 in FIG. 8, as well as reference numeral 2210 in FIG. 5B, wherein the jth hash value of the observed unique hash ($h_j$) is compared to the kth hash value of the archived unique hash that is associated with the A'th archived audio segment ($h_k$). Method 3000 continues with identifying a selected archived audio segment and a time lag based on the comparison, wherein a portion of the selected archived audio segment corresponds to the observed audio segment. See reference numeral 3400 in FIG. 8, as well as reference numerals 2710 and 2720 in FIG. 5G, which illustrates extraction of time lag data from the one or more comprehensive time lag data maps 275c and identification of a most common audio segment based on the extracted time lag data. Method 3000 continues with identifying video content corresponding to the selected archived audio segment. See reference numeral 3500 in FIG. 8, as well as reference numeral 2743 in FIG. 5G, wherein video content matching the identified audio segment is retrieved from video content repository 249. Method 3000 continues with streaming the video content to the client computing device, wherein the video content is streamed from a time point based on the time lag. See reference numeral 3600 in FIG. 8, as well as reference numeral 2744 in FIG. 5G, wherein the retrieved video content is streamed to client computing device 100.

Numerous variations and configurations will be apparent in light of this disclosure. For instance, one example embodiment provides a method for synchronizing observed audio with archived video content. The method comprises receiving an observed audio segment from a client computing device. The method further comprises generating a plurality of hash values corresponding to the observed audio segment. The method further comprises performing a comparison of each of the plurality of hash values to a plurality of archived hash values. Each of the plurality of archived hash values is associated with one of a plurality of archived audio segments. The method further comprises identifying a selected archived audio segment and a time lag based on the comparison. A portion of the selected archived audio segment corresponds to the observed audio segment. The method further comprises identifying video content corresponding to the selected archived audio segment. The method further comprises streaming the video content to the client computing device. The video content is streamed from a time point based on the time lag. In some cases (a) a plurality of time lags are identified based on the comparison; and (b) the method further comprises selecting one of the plurality of time lags based on receipt of an additional audio segment from the client computing device. In some cases the method further comprises (a) generating a synchronization map that includes a matching hash value that is found in both the plurality of hash values corresponding to the observed audio segment and the plurality of archived hash values, wherein (i) the matching hash value is keyed to one or more (observed, archived) time pairs, (ii) the observed time corresponds to a time of the observed audio segment at which the matching hash value was found, and (iii) the archived time corresponds to a time of a potentially matching archived audio segment at which the matching hash value was found; and (b) generating a time lag data map that includes (i) a listing of one or more time lags derived from the synchronization map, wherein each of the one or more time lags is defined as a difference between the observed time and the archived time, and (ii) a frequency count corresponding to each of the one or more time lags. In some cases (a) each of the plurality of hash values corresponding to the observed audio segment is paired with a time of the observed audio segment at which the hash value was generated; and (b) each of the plurality of archived hash values is paired with a time of the associated archived audio segment at which the archived hash value was generated. In some cases the method further comprises generating a synchronization map that includes a matching hash value that is found in both the plurality of hash values corresponding to the observed audio segment and the plurality of archived hash values, wherein (a) the matching hash value is keyed to one or more (observed, archived) time pairs; (b) the observed time corresponds to a time of the observed audio segment at which the matching hash value was found; and (c) the archived time corresponds to a time of a potentially matching archived audio segment at which the matching hash value was found. In some cases the method further comprises (a) receiving the plurality of archived audio segments before receiving the observed audio segment form the client computing device; and (b) generating the plurality of archived hash values. In some cases the method further comprises (a) receiving a multimedia content item before receiving the observed audio segment from the client computing device, wherein the multimedia content item includes one of the plurality of archived audio segments and corresponding video content; (b) generating the plurality of archived hash values; and (c) storing the corresponding video content in a video content repository. In some cases generating the plurality of hash values corresponding to the observed audio segment further comprises (a) dividing a frequency spectrum of the observed audio segment into a plurality of frequency bands; (b) dividing each of the plurality of frequency bands into a plurality of bin subsets; (c) identifying a bin index corresponding to a maximum power in each of the plurality of bin subsets; and (d) generating a plurality of hash values over a duration of the observed audio segment based on the bin indices associated with each of the plurality of frequency bands, wherein each of the plurality of hash values are defined by a powered sum of the bin indices. In some cases generating the plurality of hash values corresponding to the observed audio segment further comprises (a) dividing a frequency spectrum of the observed audio segment into a plurality of frequency bands; (b) dividing each of the plurality of frequency bands into a plurality of bin subsets; (c) identifying a bin index corresponding to a maximum power in each of the plurality of bin subsets; and (d) generating a plurality of hash values over a duration of the observed audio segment based on the bin indices associated with each of the plurality of frequency bands. In some cases generating the plurality of hash values corresponding to the observed audio segment further comprises (a) dividing a frequency spectrum of the observed audio segment into a plurality of frequency bands; (b) dividing each of the plurality of frequency bands into a plurality of bin subsets; (c) identifying a bin index corresponding to a maximum power in each of the plurality of bin subsets; and (d) generating a plurality of hash values over a duration of the observed audio segment based on the bin indices associated with each of the plurality of frequency bands, wherein the frequency spectrum is divided into 5, 6, 7, 8, 9 or 10 frequency bands, and each of the frequency bands is divided into 3, 4, 5, 6, 7 or 8 bin subsets.

Another example embodiment provides a system for video synchronization that comprises an archived content processing module that is configured to receive multimedia content that includes audio content and video content. The archived content processing module further includes an archived content hashing sub-module configured to generate archived unique hash data based on the audio content. The system further comprises an observed content processing module that is configured to receive an observed audio segment from a client computing device. The observed content processing module includes an observed content hashing sub-module configured to generate observed unique hash data based on the observed audio segment. The system further comprises a memory configured to store a comprehensive time lag data map that correlates a plurality of archived audio segments with a list of (time lag, count) data pairs. The time lag is based on a comparison of the archived unique hash data and the observed unique hash data. The count is based on a frequency of the paired time lag. The system further comprises a waveform manager that is configured to (a) identify a matching archived audio segment that corresponds to the observed audio segment based on a maximum count identified from the comprehensive time lag data map, and (b) transmit video content that was received with the matching archived audio segment to the client computing device. In some cases the observed content processing module is configured to send the client computing device an instruction to terminate transmission of the observed audio segment in response to receipt of a predetermined duration of the observed audio segment. In some cases the observed content processing module is configured to receive a second observed audio segment from the client computing device in response to the waveform manager detecting that the maximum count identified from the comprehensive time lag data map is associated with a plurality of time lags. In some cases the video content that was received with the matching archived audio segment is streamed to the client computing device. In some cases the system further comprises (a) a video content repository configured to store the video content included in the received multimedia content; and (b) a content manager configured to retrieve the video content from the video content repository and to provide the retrieved video content to the waveform manager. In some cases the system further comprises a client computing device configured to record the observed audio segment and send the observed audio segment to the observed content processing module.

Another example embodiment provides a computer program product encoded with instructions that, when executed by one or more processors, causes a process for synchronizing observed audio with archived video content to be carried out. The process comprises receiving an observed audio segment from a client computing device. The process further comprises identifying an archived audio segment that includes at least a portion of the observed audio segment. The process further comprises determining a time lag corresponding to a relative time offset between the observed audio segment and the archived audio segment. The process further comprises transmitting video content to the client computing device. The video content is associated with the archived audio segment. The video content is transmitted from a time point that is at least partially based on the time lag. In some cases the observed audio segment is streamed from the client computing device for a predetermined recording period. In some cases the process further comprises receiving the archived audio segment before receiving the observed audio segment, wherein the archived audio segment is not received from the client computing device. In some cases identifying the archived audio segment further comprises (a) generating a plurality of hash values corresponding to the observed audio segment; and (b) performing a comparison of each of the plurality of hash values to a plurality of archived hash values, wherein each of the plurality of archived hash values is associated with one of a plurality of archived audio segments.

The foregoing detailed description has been presented for illustration. It is not intended to be exhaustive or to limit the disclosure to the precise form described. Many modifications and variations are possible in light of this disclosure. Therefore it is intended that the scope of the disclosure be limited not by this detailed description, but rather by the claims appended hereto. Subsequently filed applications claiming priority to this application may claim the disclosed subject matter in a different manner, and may generally include any set of one or more features as variously disclosed or otherwise demonstrated herein.

What is claimed is:

1. A method for synchronizing observed audio with archived video content, the method comprising:
   receiving an observed audio segment from a client computing device, wherein the observed audio segment corresponds to ambient audio recorded by the client computing device;
   generating a plurality of hash values corresponding to the observed audio segment;
   performing a comparison of each of the plurality of hash values to a plurality of archived hash values, wherein each of the plurality of archived hash values (a) is associated with one of a plurality of archived audio segments, and (b) is stored in a data repository that is separate from the client computing device;
   identifying a selected archived audio segment and a time lag based on the comparison, wherein a portion of the selected archived audio segment corresponds to the observed audio segment;
   identifying video content corresponding to the selected archived audio segment, wherein the identified video content is stored in a video content repository that is separate from the client computing device; and
   streaming the identified video content to the client computing device from a time point based on the time lag.

2. The method of claim 1, wherein:
   a plurality of time lags are identified based on the comparison; and the method further comprises selecting one of the plurality of time lags based on receipt of an additional audio segment from the client computing device.

3. The method of claim 1, further comprising:
   generating a synchronization map that includes a matching hash value that is found in both the plurality of hash values corresponding to the observed audio segment and the plurality of archived hash values, wherein:
   the matching hash value is keyed to one or more (observed, archived) time pairs,
   the observed time corresponds to a time of the observed audio segment at which the matching hash value was found, and
   the archived time corresponds to a time of a potentially matching archived audio segment at which the matching hash value was found; and generating a time lag data map that includes (a) a listing of one or more time lags derived from the synchronization map, wherein each of the one or more time lags is defined as a difference between the observed time and the archived time, and (b) a frequency count corresponding to each of the one or more time lags.

4. The method of claim 1, wherein:
   each of the plurality of hash values corresponding to the observed audio segment is paired with a time of the observed audio segment at which the hash value was generated; and
   each of the plurality of archived hash values is paired with a time of the associated archived audio segment at which the archived hash value was generated.

5. The method of claim 1, further comprising generating a synchronization map that includes a matching hash value that is found in both the plurality of hash values corresponding to the observed audio segment and the plurality of archived hash values, wherein:
   the matching hash value is keyed to one or more (observed, archived) time pairs;
   the observed time corresponds to a time of the observed audio segment at which the matching hash value was found; and
   the archived time corresponds to a time of a potentially matching archived audio segment at which the matching hash value was found.

6. The method of claim 1, further comprising:
   receiving the plurality of archived audio segments before receiving the observed audio segment form the client computing device; and
   generating the plurality of archived hash values.

7. The method of claim 1, further comprising: receiving a multimedia content item before receiving the observed audio segment from the client computing device, wherein the multimedia content item includes one of the plurality of archived audio segments and corresponding video content;

generating the plurality of archived hash values; and
storing the corresponding video content in the video content repository.

8. The method of claim 1, wherein generating the plurality of hash values corresponding to the observed audio segment further comprises:
dividing a frequency spectrum of the observed audio segment into a plurality of frequency bands;
dividing each of the plurality of frequency bands into a plurality of bin subsets;
identifying a bin index corresponding to a maximum power in each of the plurality of bin subsets; and
generating a plurality of hash values over a duration of the observed audio segment based on the bin indices associated with each of the plurality of frequency bands, wherein each of the plurality of hash values are defined by a powered sum of the bin indices.

9. The method of claim 1, wherein generating the plurality of hash values corresponding to the observed audio segment further comprises:
dividing a frequency spectrum of the observed audio segment into a plurality of frequency bands;
dividing each of the plurality of frequency bands into a plurality of bin subsets;
identifying a bin index corresponding to a maximum power in each of the plurality of bin subsets; and
generating a plurality of hash values over a duration of the observed audio segment based on the bin indices associated with each of the plurality of frequency bands.

10. The method of claim 1, wherein generating the plurality of hash values corresponding to the observed audio segment further comprises:
dividing a frequency spectrum of the observed audio segment into a plurality of frequency bands;
dividing each of the plurality of frequency bands into a plurality of bin subsets;
identifying a bin index corresponding to a maximum power in each of the plurality of bin subsets; and
generating a plurality of hash values over a duration of the observed audio segment based on the bin indices associated with each of the plurality of frequency bands,
wherein the frequency spectrum is divided into 5, 6, 7, 8, 9 or 10 frequency bands, and each of the frequency bands is divided into 3, 4, 5, 6, 7 or 8 bin subsets.

11. A system for video synchronization that comprises a memory device and a processor that is operatively coupled to the memory device, wherein the processor is configured to execute instructions stored in the memory device that, when executed, cause the processor to carry out a process for synchronizing observed audio with archived video content, the process comprising:
receiving multimedia content that includes audio content and video content;
generating archived unique hash data based on the audio content; storing the archived unique hash data in a data repository; receiving an observed audio segment from a client computing device that is separate from the data repository;
generating observed unique hash data based on the observed audio segment;
storing in the memory device, a comprehensive time lag data map that correlates a plurality of archived audio segments with a list of (time lag, count) data pairs, wherein the time lag is based on a comparison of the archived unique hash data and the observed unique hash data, and wherein the count is based on a frequency of the paired time lag;
identifying a matching archived audio segment that corresponds to the observed audio segment based on a maximum count identified from the comprehensive time lag data map: and,
transmitting video content that was received with the matching archived audio segment to the client computing device.

12. The system of claim 11, wherein the process for synchronizing observed audio with archived video content further comprises sending the client computing device an instruction to terminate transmission of the observed audio segment in response to receipt of a predetermined duration of the observed audio segment.

13. The system of claim 11, wherein the process for synchronizing observed audio with archived video content further comprises receiving a second observed audio segment from the client computing device in response to detecting that the maximum count identified from the comprehensive time lag data map is associated with a plurality of time lags.

14. The system of claim 11, wherein the video content that was received with the matching archived audio segment is streamed to the client computing device.

15. The system of claim 11, further comprising: a video content repository configured to store the video content included in the received multimedia content, wherein:
the video content repository is separate from the client computing device;
and
the process for synchronizing observed audio with archived video content further comprises retrieving the video content from the video content repository.

16. The system of claim 11, wherein the process for synchronizing observed audio with archived video content further comprises recording the observed audio segment by the client computing.

17. A non-transitory computer readable medium with instructions that, when executed by one or more processors, causes a process for synchronizing observed audio with archived content to be carried out, the process comprising:
receiving an observed audio segment from a client computing device wherein the observed audio segment corresponds to ambient audio recorded by the client computing device;
identifying an archived audio segment that includes at least a portion of the observed audio segment, wherein the archived audio segment is stored in a data repository that is separate from the client computing device;
determining a time lag corresponding to a relative time offset between the observed audio segment and the archived audio segment;
transmitting archived content to the client computing device, wherein the archived content is associated with the archived audio segment, and wherein the archived content is transmitted from a time point that is at least partially based on the time lag.

18. The non-transitory computer readable medium of claim 17, wherein the archived content comprises visual content.

19. The non-transitory computer readable medium of claim 17, wherein the process further comprises receiving the archived audio segment before receiving the observed audio segment, wherein the archived audio segment is not received from the client computing device.

20. The non-transitory computer readable medium of claim 17, wherein identifying the archived audio segment further comprises:
generating a plurality of hash values corresponding to the observed audio segment; and performing a comparison of each of the plurality of hash values to a plurality of archived hash values, wherein each of the plurality of archived hash values is associated with one of a plurality of archived audio segments.

* * * * *